US012068985B2

(12) United States Patent
Cheng et al.

(10) Patent No.: US 12,068,985 B2
(45) Date of Patent: Aug. 20, 2024

(54) RADIO LINK MONITORING REFERENCE SIGNAL RESOURCE RECONFIGURATION

(71) Applicant: Qualcomm Incorporated, San Diego, CA (US)

(72) Inventors: Peng Cheng, Beijing (CN); Hung Dinh Ly, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 130 days.

(21) Appl. No.: 17/041,066

(22) PCT Filed: Apr. 3, 2019

(86) PCT No.: PCT/CN2019/081273
§ 371 (c)(1),
(2) Date: Sep. 24, 2020

(87) PCT Pub. No.: WO2019/192523
PCT Pub. Date: Oct. 10, 2019

(65) Prior Publication Data
US 2021/0099263 A1    Apr. 1, 2021

(30) Foreign Application Priority Data
Apr. 5, 2018  (WO) ................ PCT/CN2018/082060

(51) Int. Cl.
H04L 5/00       (2006.01)
H04W 72/044     (2023.01)
H04W 72/542     (2023.01)

(52) U.S. Cl.
CPC ......... H04L 5/0048 (2013.01); H04W 72/046 (2013.01); H04W 72/542 (2023.01)

(58) Field of Classification Search
CPC .. H04L 5/0048; H04W 72/046; H04W 72/085
See application file for complete search history.

(56) References Cited

U.S. PATENT DOCUMENTS

2012/0155272 A1* 6/2012 Quan ................... H04W 72/51
                                                 370/235
2014/0043988 A1   2/2014 Chen et al.
(Continued)

FOREIGN PATENT DOCUMENTS

CN      103384382 A      11/2013
CN      105210315 A      12/2015
WO   WO-2018027904 A1     2/2018

OTHER PUBLICATIONS

Ericsson: "Remaining Details for Radio Link Monitoring", 3GPP Draft, 3GPP TSG RAN WG1 Meeting #92, R1-1802948, Remaining Details for Radio Link Monitoring, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018 (Feb. 17, 2018), XP051398330, 6 Pages, Retrieved from the Internet: URL: http://www.3gpp.org/ftp/tsg%5Fran/WG1%5FRL1/TSGR1%5F92/Docs/. [retrieved on Feb. 17, 2018] paragraph [2.3.1].
(Continued)

Primary Examiner — Walter J Divito
(74) Attorney, Agent, or Firm — QUALCOMM Incorporated

(57) ABSTRACT

Methods, systems, and devices for wireless communications are described. A user equipment (HE) may support beam management to determine beams for communicating with a base station, measure characteristics of the beams, and periodically report the measurements to the base station. The beam management may include a beam failure recovery procedure, where the UE detects and resolves a beam failure with the base station. Additionally, the UE may perform radio link monitoring (RLM) on a set of reference signals configured by the base station to determine if a radio link (e.g, beamformed transmission) is synchronized or not between the UE and base station. In some cases, these RLM
(Continued)

reference signals (RLM-RSs) may be reconfigured, where the reconfiguration may be based on the periodic beam measurement reports for beam management, a beam monitoring event trigger, a beam failure recovery, or a combination thereof.

17 Claims, 21 Drawing Sheets

(56) References Cited

U.S. PATENT DOCUMENTS

| | | | |
|---|---|---|---|
| 2017/0041112 A1* | 2/2017 | Kim | H04W 4/70 |
| 2018/0279287 A1* | 9/2018 | John Wilson | H04B 7/0695 |
| 2019/0053193 A1* | 2/2019 | Park | H04W 76/27 |
| 2019/0081691 A1* | 3/2019 | Nagaraja | H04W 56/0005 |
| 2020/0178130 A1* | 6/2020 | Pakniat | H04W 36/0094 |

OTHER PUBLICATIONS

Mediatek Inc: "RLM and RLF in HF NR," 3GPP Draft, 3GPP TSG-RAN WG2 Meeting 97bis, R2-1702770, 3rd Generation Partnership Project (3GPP), Mobile Competence Centre; 650, Route Des Lucioles; F-06921 Sophia-Antipolis Cedex; France, vol. RAN WG2, No. Spokane, USA; Apr. 3, 2017-Apr. 7, 2017, Apr. 3, 2017, XP051244758, 6 pages, Retrieved from the Internet: URL: http://www.3gpp.org/ftp/Meetings_3GPP_SYNC/RAN2/Docs/ [retrieved on Apr. 3, 2017].
NTT Docomo: et al., "Remaining Issues on Radio Link Monitoring for Mobility Management", 3GPP Draft, 3GPP TSG RAN WG1 Meeting AH 1801, R1-1800656, Discussion on NR RLM and RLF Final, 3rd Generation Partnership Project (3GPP), Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, Jan. 13, 2018 (Jan. 13, 2018), pp. 1-5, XP051384978, Retrieved from the Internet: URL: http://www.3gpp.org/ftp/tsg%5Fran/WG1%5FRL1/TSGR1%5FAH/NR%5FAH%5F1801/Docs/. [Retrieved on Jan. 13, 2018] paragraph [0002].
OPPO: "Discussion on RLM Parameter Reconfiguration", 3GPP Draft, 3GPP TSG-RAN2 Meeting#101, R2-1802272, Discussion on RLM Parameter Reconfiguration, 3rd Generation Partnership Project (3GPP), Mobile Competence Centre, 650, Route Des Lucioles, F-06921 Sophia-Antipolis Cedex, France, vol. RAN WG2, No. Athens, Greece, Feb, 26, 2018-Mar. 2, 2018, Feb. 14, 2018 (Feb. 14, 2018), XP051399169, 3 Pages, Retrieved from the Internet: URL: http://www.3gpp.org/ftp/tsg%5Fran/WG2%5FRL2/TSGR2%5F101/Docs/. [Retrieved on Feb. 14, 2018].
Qualcomm Incorporated: "Radio Link Monitoring Consideration", 3GPP Draft, 3GPP TSG RAN WG1 Meeting #92, R1-1802816 Radio Link Monitoring Consideration, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018 Feb. 17, 2018, XP051398228, pp. 1-7, Retrieved from the Internet: URL:http://www.3gpp.org/ftp/tsg%5Fran/WG1%5FRL1/TSGR1%5F92/Docs/ [retrieved on Feb. 17, 2018], pp. 1.2, figure 2.
"RLM and RLF in HF NR," 3GPP Draft; R2-164899, 3rd Generation Partnership Project (3GPP), Mobile Competence Centre; 650, Route Des Lucioles; F-06921 Sophia-Antipolis Cedex; France, vol. RAN WG2, No. Gothenburg, Sweden; Aug. 22, 2016-Aug. 26, 2016, Aug. 21, 2016, XP051140905, 4 pages, Retrieved from the Internet: URL: http://www.3gpp.org/ftp/Meetings_3GPP_SYNC/RAN2/Docs/ [retrieved on Aug. 21, 2016].
Supplementary European Search Report—EP19781655—Search Authority—Munich—Dec. 9, 2021.
Zte, et al., "Remaining details of Rlm", 3GPP Draft, 3GPP TSG RAN WG1 Meeting #92, R1-1801412, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018 (Feb. 17, 2018), XP051397552, 5 Pages, Retrieved from the Internet: URL: http://www.3gpp.org/ftp/tsg%5Fran/WG1%5FRL1/TSGR1%5F92/Docs/. [Retrieved on Feb. 17, 2018] paragraph [0002].
International Search Report and Written Opinion—PCT/CN2018/082060—ISA/EPO—Aug. 27, 2018.
International Search Report and Written Opinion—PCT/CN2019/081273—ISA/EPO—Jul. 10, 2019.
Motorola Mobility., et al., "Beam Recovery and Radio Link Monitoring", R1-1716640, Beam Recovery and Radio Link Monitoring, 3rd Generation Partnership Project (3GPP), Mobile Competence Centre, 650, Route Des Lucioles, F-06921 Sophia-Antipolis Cedex, France, vol. RAN WG1, No. Nagoya, Japan; Sep. 18, 2017-Sep. 21, 2017 Sep. 17, 2017, XP051340090, Retrieved from the Internet: URL:http://www.3gpp.org/ftp/Meetings_3GPP_SYNC/RAN1/Docs/ [retrieved on Sep. 17, 2017] Section 1, 4 pages.
Motorola Mobility et al., "Radio Link Monitoring and Beam Recovery", R1-1800729, 3GPP TSG RAN WG1 Meeting AH 1801, Jan. 26, 2018(Jan. 26, 2018), pp. 1-3, Sections 1-3.

* cited by examiner

RADIO LINK MONITORING REFERENCE SIGNAL RESOURCE RECONFIGURATION

CROSS REFERENCES

The present Application is a 371 national phase filing of International Patent Application No. PCT/CN2019/081273 by Cheng et al., entitled "RADIO LINK MONITORING REFERENCE SIGNAL RESOURCE RECONFIGURATION," filed Apr. 3, 2019; and to International Patent Application No. PCT/CN2018/082060 by Cheng et al., entitled "RADIO LINK MONITORING REFERENCE SIGNAL RESOURCE RECONFIGURATION," filed Apr. 5, 2018, each of which is assigned to the assignee hereof and each of which is hereby incorporated by reference in its entirety.

BACKGROUND

The following relates generally to wireless communication, and more specifically to radio link monitoring reference signal (RLM-RS) resource reconfiguration.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as NR systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems (e.g., systems supporting millimeter wave (mmW) communications), beamforming may be used in order to overcome the relatively high path losses associated with frequencies in these systems. In order to support beamformed transmissions, communicating wireless devices (e.g., a base station, UE, etc.) may be operable to discover and maintain suitable beams for a given communication link. The set of procedures and protocols required for this task may be referred to as beam management. For example, one or more beams may be determined for communications between a base station and UE. The UE may then periodically measure characteristics of received beamformed signals on the one or more beams and report the measured characteristics to the base station. Additionally, the UE may perform radio link monitoring (RLM) on a configured set of reference signals (e.g., RLM-RSs) to determine if a particular beam is efficient for communications with the base station (e.g., whether the beam is in-sync or out-of-sync). However, due to the directional, low spread nature of beamformed transmissions, the UE may inefficiently perform RLM during mobility.

SUMMARY

The described techniques relate to improved methods, systems, devices, or apparatuses that support radio link monitoring reference signal (RLM-RS) resource reconfiguration. Generally, the described techniques provide for a user equipment (UE) to receive a RLM-RS resource configuration for a set of RLM-RS resources from a base station, measure a characteristic (e.g., signal strength) of one or more candidate beams from the base station that are different than the set of RLM-RS resources, and reconfigure the RLM-RS resources based on the measured characteristic. In some cases, the UE may autonomously reconfigure the set of RLM-RS resources based on a subset of the candidate beams having the highest characteristic measurements (e.g., a set of strongest beams). Alternatively, the UE may signal an indication of the subset of candidate beams with the highest characteristic measurements to the base station and receive a resource reconfiguration message in response in order to reconfigure the RLM-RS resources. Additionally or alternatively, the UE may identify a beam monitoring event trigger that causes the UE to transmit the subset of the candidate beams with the highest characteristic measurements to the base station, where the UE may receive the resource reconfiguration message in response to reconfigure the RLM-RS resources. In some cases, the UE may receive the resource reconfiguration message after a successful beam failure recovery, where the resource reconfiguration message may be based on an indicated candidate beam as part of the beam failure recovery.

A method of wireless communications is described. The method may include receiving, at a UE, an RLM-RS resource configuration for a set of RLM-RS resources, measuring a quality characteristic of one or more candidate beams, where the one or more candidate beams are different than the set of RLM-RS resources, and reconfiguring the set of RLM-RS resources based on the measuring.

An apparatus for wireless communications is described. The apparatus may include a processor, memory in electronic communication with the processor, and instructions stored in the memory. The instructions may be executable by the processor to cause the apparatus to receive, at a UE, an RLM-RS resource configuration for a set of RLM-RS resources, measure a quality characteristic of one or more candidate beams, where the one or more candidate beams are different than the set of RLM-RS resources, and reconfigure the set of RLM-RS resources based on the measuring.

Another apparatus for wireless communications is described. The apparatus may include means for receiving, at a UE, an RLM-RS resource configuration for a set of RLM-RS resources, means for measuring a quality characteristic of one or more candidate beams, where the one or more candidate beams are different than the set of RLM-RS resources, and means for reconfiguring the set of RLM-RS resources based on the measuring.

A non-transitory computer-readable medium storing code for wireless communications is described. The code may include instructions executable by a processor to receiving, at a UE, an RLM-RS resource configuration for a set of RLM-RS resources, measuring a quality characteristic of one or more candidate beams, where the one or more candidate beams are different than the set of RLM-RS resources, and reconfiguring the set of RLM-RS resources based on the measuring.

Some examples of the method, apparatuses, and non-transitory computer-readable medium described herein may further include operations, features, means, or instructions for identifying a subset of the one or more candidate beams with a highest quality characteristic measurement and reconfiguring the set of RLM-RS resources to correspond to the identified subset of candidate beams.

Some examples of the method, apparatuses, and non-transitory computer-readable medium described herein may further include operations, features, means, or instructions for continuing one or more timers and one or more counters associated with RLM synchronization based on reconfiguring the set of RLM-RS resources.

In some examples of the method, apparatuses, and non-transitory computer-readable medium described herein, the one or more timers associated with RLM synchronization include at least a T310 timer and the one or more counters associated with RLM synchronization include at least an N310 counter and N311 counter.

Some examples of the method, apparatuses, and non-transitory computer-readable medium described herein may further include operations, features, means, or instructions for receiving an indication for a number of candidate beams for the subset of the one or more candidate beams via radio resource control (RRC) messaging.

Some examples of the method, apparatuses, and non-transitory computer-readable medium described herein may further include operations, features, means, or instructions for identifying a subset of one or more candidate beams with a highest quality characteristic measurement, transmitting an indication of the identified subset of candidate beams and receiving an RLM-RS reconfiguration message based on the identified subset of candidate beams.

Some examples of the method, apparatuses, and non-transitory computer-readable medium described herein may further include operations, features, means, or instructions for resetting one or more timers and one or more counters associated with RLM synchronization based on receiving the RLM-RS reconfiguration message.

In some examples of the method, apparatuses, and non-transitory computer-readable medium described herein, the measuring may include operations, features, means, or instructions for performing periodic beam monitoring based on a beam monitoring configuration.

Some examples of the method, apparatuses, and non-transitory computer-readable medium described herein may further include operations, features, means, or instructions for identifying a beam monitoring event trigger based on the measuring, transmitting an indication of a subset of the one or more candidate beams with a highest quality characteristic measurement based on identifying the beam monitoring event trigger and receiving an RLM-RS reconfiguration message based on the transmitted indication.

In some examples of the method, apparatuses, and non-transitory computer-readable medium described herein, the beam monitoring event trigger includes a candidate beam of the one or more candidate beams having a quality characteristic that exceeds a threshold, a candidate beam of the one or more candidate beams having a quality characteristic that exceeds by an offset a quality characteristic of a resource of the set of RLM-RS resources, a candidate beam of the one or more candidate beams having a quality characteristic that exceeds by an offset a second threshold while a resource of the set of RLM-RS resources may have a quality characteristic that falls below a third threshold.

In some examples of the method, apparatuses, and non-transitory computer-readable medium described herein, the set of RLM-RS resources may be reconfigured via RRC messaging.

A method of wireless communications is described. The method may include receiving, at a UE, an RLM-RS resource configuration for a set of RLM-RS resources, transmitting an indication of a candidate beam for beam failure recovery, and receiving an RLM-RS reconfiguration message based on the indicated candidate beam.

An apparatus for wireless communications is described. The apparatus may include a processor, memory in electronic communication with the processor, and instructions stored in the memory. The instructions may be executable by the processor to cause the apparatus to receive, at a UE, an RLM-RS resource configuration for a set of RLM-RS resources, transmit an indication of a candidate beam for beam failure recovery, and receive an RLM-RS reconfiguration message based on the indicated candidate beam.

Another apparatus for wireless communications is described. The apparatus may include means for receiving, at a UE, an RLM-RS resource configuration for a set of RLM-RS resources, means for transmitting an indication of a candidate beam for beam failure recovery, and means for receiving an RLM-RS reconfiguration message based on the indicated candidate beam.

A non-transitory computer-readable medium storing code for wireless communications is described. The code may include instructions executable by a processor to receiving, at a UE, an RLM-RS resource configuration for a set of RLM-RS resources, transmitting an indication of a candidate beam for beam failure recovery, and receiving an RLM-RS reconfiguration message based on the indicated candidate beam.

Some examples of the method, apparatuses, and non-transitory computer-readable medium described herein may further include operations, features, means, or instructions for resetting one or more timers and one or more counters associated with RLM synchronization based on receiving the RLM-RS reconfiguration message.

In some examples of the method, apparatuses, and non-transitory computer-readable medium described herein, the one or more timers associated with RLM synchronization include at least a T310 timer and the one or more counters associated with RLM synchronization include at least an N310 counter and N311 counter.

In some examples of the method, apparatuses, and non-transitory computer-readable medium described herein, the RLM-RS reconfiguration message may be received via RRC messaging.

A method of wireless communications is described. The method may include transmitting, to a UE, an RLM-RS resource configuration for a set of RLM-RS resources, receiving an indication of a subset of one or more candidate beams with a highest quality characteristic measurement, where the one or more candidate beams are different than the set of RLM-RS resources, and transmitting an RLM-RS reconfiguration message based on the indicated subset of candidate beams.

An apparatus for wireless communications is described. The apparatus may include a processor, memory in electronic communication with the processor, and instructions stored in the memory. The instructions may be executable by the processor to cause the apparatus to transmit, to a UE, an RLM-RS resource configuration for a set of RLM-RS resources, receive an indication of a subset of one or more candidate beams with a highest quality characteristic measurement, where the one or more candidate beams are different than the set of RLM-RS resources, and transmit an RLM-RS reconfiguration message based on the indicated subset of candidate beams.

Another apparatus for wireless communications is described. The apparatus may include means for transmitting, to a UE, an RLM-RS resource configuration for a set of RLM-RS resources, means for receiving an indication of a subset of one or more candidate beams with a highest quality characteristic measurement, where the one or more candidate beams are different than the set of RLM-RS resources, and means for transmitting an RLM-RS reconfiguration message based on the indicated subset of candidate beams.

A non-transitory computer-readable medium storing code for wireless communications is described. The code may include instructions executable by a processor to transmitting, to a UE, an RLM-RS resource configuration for a set of RLM-RS resources, receiving an indication of a subset of one or more candidate beams with a highest quality characteristic measurement, where the one or more candidate beams are different than the set of RLM-RS resources, and transmitting an RLM-RS reconfiguration message based on the indicated subset of candidate beams.

Some examples of the method, apparatuses, and non-transitory computer-readable medium described herein may further include operations, features, means, or instructions for transmitting an indication for a number of candidate beams for the subset of the one or more candidate beams via RRC messaging.

In some examples of the method, apparatuses, and non-transitory computer-readable medium described herein, the RLM-RS reconfiguration message may be transmitted via RRC messaging.

In some examples of the method, apparatuses, and non-transitory computer-readable medium described herein, the indication of the subset of one or more candidate beams may be received periodically.

A method of wireless communications is described. The method may include transmitting, to a UE, an RLM-RS resource configuration for a set of RLM-RS resources, receiving an indication of a candidate beam for beam failure recovery, and transmitting an RLM-RS reconfiguration message based on the indicated candidate beam.

An apparatus for wireless communications is described. The apparatus may include a processor, memory in electronic communication with the processor, and instructions stored in the memory. The instructions may be executable by the processor to cause the apparatus to transmit, to a UE, an RLM-RS resource configuration for a set of RLM-RS resources, receive an indication of a candidate beam for beam failure recovery, and transmit an RLM-RS reconfiguration message based on the indicated candidate beam.

Another apparatus for wireless communications is described. The apparatus may include means for transmitting, to a UE, an RLM-RS resource configuration for a set of RLM-RS resources, means for receiving an indication of a candidate beam for beam failure recovery, and means for transmitting an RLM-RS reconfiguration message based on the indicated candidate beam.

A non-transitory computer-readable medium storing code for wireless communications is described. The code may include instructions executable by a processor to transmitting, to a UE, an RLM-RS resource configuration for a set of RLM-RS resources, receiving an indication of a candidate beam for beam failure recovery, and transmitting an RLM-RS reconfiguration message based on the indicated candidate beam.

In some examples of the method, apparatuses, and non-transitory computer-readable medium described herein, the RLM-RS reconfiguration message may be transmitted via RRC messaging.

DETAILED DESCRIPTION

In some wireless communications systems, beamforming may be used to overcome path loss associated with frequencies of these wireless systems. Beamforming may generally be used in any scenario in which improved cellular coverage is desired. In order to support beamformed transmissions, a user equipment (UE) may support beam management to determine one or more beams for communicating with a base station, which may further include measuring characteristics of the one or more beams and periodically reporting the measurements to the base station. For example, the beam management may include beam failure recovery, where the UE detects and resolves a beam failure with the base station. Additionally, the UE may perform radio link monitoring (RLM) on a set of reference signals configured by the base station. These RLM reference signals (RLM-RSs) may enable the UE to determine if a radio link (e.g., beamformed transmission) is in-sync or out-of-sync for communications between the UE and the base station. In some cases, the RLM-RSs may be reconfigured when the UE moves from a coverage area of one set of beams to another or based on additional changing conditions between the UE and base station. The reconfigured RLM-RSs may be based on a set of beams that have a strongest (or stronger) signal comparatively to other beams measured by the UE from the base station (e.g., as part of a beam management procedure). These strongest beams may be determined from the periodic beam measurement reports for beam management, aperiodically after a beam monitoring event trigger occurs, after a beam failure recovery, or a combination thereof. In this way, the RLM-RS reconfiguration at a UE may be implicitly based on or otherwise linked to the beam management procedure.

Aspects of the disclosure are initially described in the context of wireless communications systems. Additional aspects of the disclosure are then described with respect to a beam management scheme, an RLM synchronization timer, and a process flow. Aspects of the disclosure are further illustrated by and described with reference to apparatus diagrams, system diagrams, and flowcharts that relate to RLM-RS resource reconfiguration.

Figure 1:
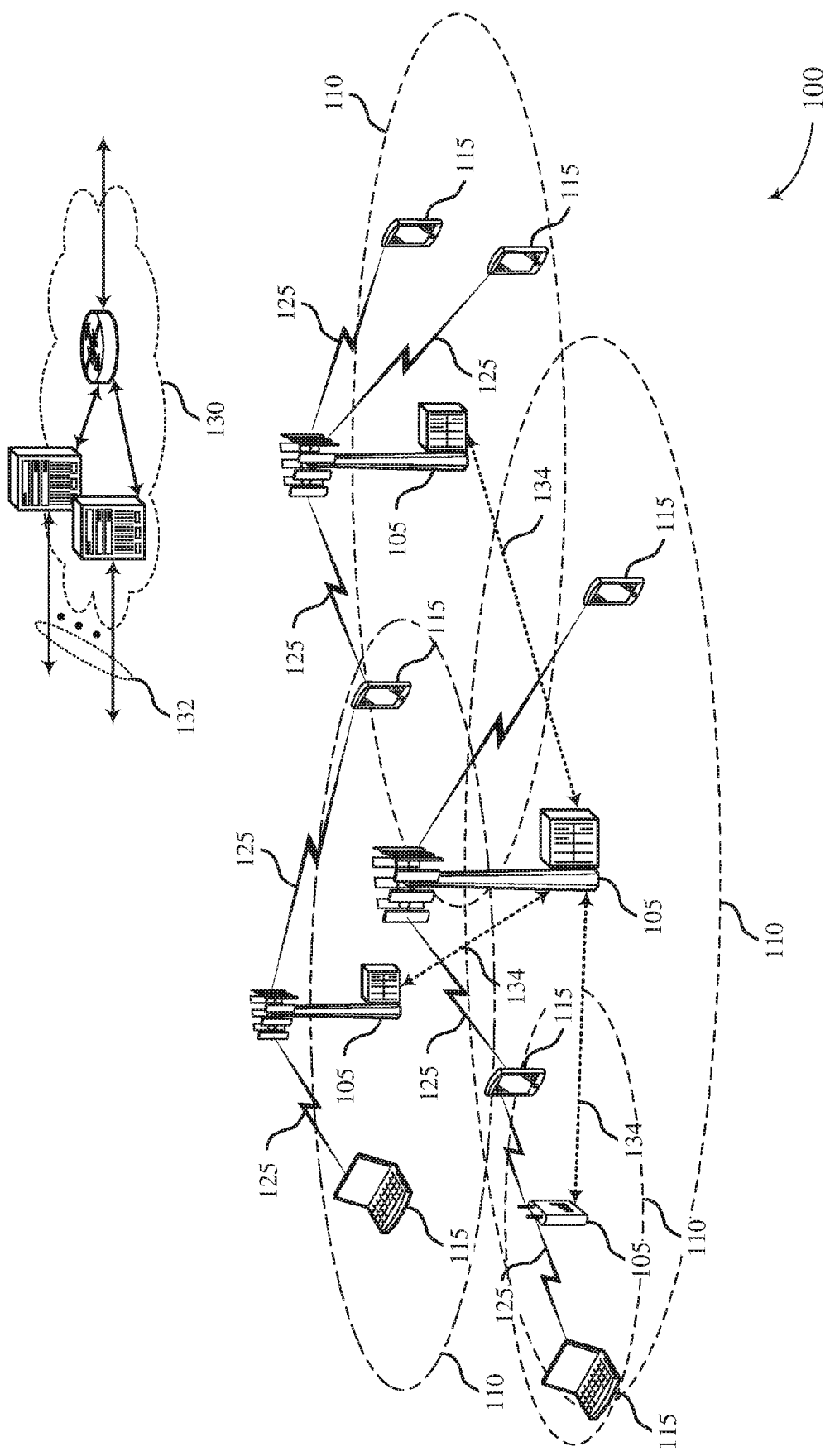
FIG. 1 illustrates an example of a wireless communications system that supports radio link monitoring reference signal (RLM-RS) resource reconfiguration in accordance with aspects of the present disclosure.

FIG. 1 illustrates an example of a wireless communications system 100 that supports radio link monitoring reference signal resource reconfiguration in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communications between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

As described above, a UE 115 and a base station 105 may support beamforming for communications. Accordingly, the UE 115 may further utilize beam management to acquire and maintain a set of transmission reception points (TRxPs) and/or UE beams for downlink and uplink transmission/reception (e.g., through L1/L2 procedures). For example, the beam management may include a beam determination step, where the base station 105 and the UE 115 select respective transmission and reception beams. Additionally, the UE 115 may measure characteristics of received beamformed signals in a beam measurement step of the beam management. The UE 115 may then report information of the beamformed signals based on the beam measurement in a beam reporting step of the beam management. In some cases, an RRC connection may not know which beam is utilized for transmission at a certain time, thereby resulting in a beam management without RRC involvement. The beam management may include measuring and reporting characteristics for synchronization signal blocks (SSBs) and/or channel state information reference signals (CSI-RSs), where up to 64 SSBs may be configured for the beam management. The UE 115, in some cases, may utilize the beam management for a beam failure recovery.

Initially, as part of the beam failure recovery, the UE 115 may detect a beam failure. For example, the UE 115 may measure a block error ratio (BLER) for downlink messages (e.g., physical downlink control channel (PDCCH)) of control serving beams from the base station 105. If a hypothetical BLER for the downlink messages is above a threshold, the UE 115 may determine a beam failure and may transmit an indication of the failure to the base station 105 (e.g., from PHY layer to MAC layer). The UE 115 may then identify a candidate beam for switching the communications. In some case, the candidate beam may be identified based on a measurement criterion or criteria by the UE 115 (e.g., L1 reference signal received power (RSRP) for the candidate beam is above a threshold). Both a SSB and a CSI-RS may be configured (e.g., simultaneously) for the new candidate beam identification. If multiple candidate beams meet the measurement criterion or criteria, the UE 115 may choose one of the candidate beams.

The UE 115 may then transmit a beam recovery request to the base station 105 that includes the identification of the selected candidate beam. If the candidate beam is associated with dedicated random access channel (RACH) resources and the candidate beam is above the threshold, the UE 115 may transmit the beam recovery request through a contention free random access (CFRA) procedure. Alternatively, if the candidate beam does not have dedicated RACH resources or is not above the threshold, the UE may transmit the beam recovery request through a contention based random access (CBRA) procedure. The UE 115 may then monitor for a recovery response from the base station 105 based on the beam recovery request. For example, the UE 115 may monitor a downlink control channel (e.g., PDCCH) on the candidate beam addressed to a cell radio network temporary identifier (C-RNTI) specific to the UE 115 for the recovery response within a time duration (e.g., configured by RRC). In some cases, the base station 105 may transmit the recovery response in a random access response (RAR) message on the candidate beam. Accordingly, if the UE 115 receives the recovery response, the selected candidate beam may be utilized for subsequent communications with the base station 105.

In addition to the beam management, the UE 115 may further utilize RLM to support communications with the base station 105, where the RLM may be CSI-RS or SSB based. In some cases, RLM may enable the UE 115 to determine if the communications are synchronized between the UE 115 and the base station 105. For example, the UE 115 may monitor downlink reference signals as part of the RLM (e.g., RLM-RSs). The base station 105 may configure X RLM-RS resources for the UE 115, where X is based on a frequency (f) range for the UE 115. If the RLM is based on SSBs, a maximum number of links (L) (e.g., number of beams) and maximum values for X for different frequency may be given as follows in Table 1. The values in Table 1 are one example, and other ranges for X and L are possible.

TABLE 1

Values of X and L for Different Frequency Ranges

| | f < 3 GHz | 3 GHz < f < 6 GHz | f > 6 GHz |
|---|---|---|---|
| Maximum Value X for RLM | 2 | 4 | 8 |
| Maximum Value L for RLM | 4 | 8 | 64 |

Based on the signal strength (e.g., RSRP) of the RLM-RSs, the UE 115 may determine if it can decode a downlink channel from the base station 105 (e.g., PDCCH). In some cases, the UE 115 may utilize different RLM-RS types (e.g., NR synchronization signals (NR-SS) or CSI-RS) to determine if the downlink channel can be decoded. If the UE 115 can consistently decode the downlink channel, then the communications and link (or beam) may be determined to be in-sync. Accordingly, the UE 115 may utilize a timer and one or more counters to determine the consistency with which the downlink channel can be decoded. For example, a first counter (e.g., n310 counter) may indicate a number of out-of-sync intervals that the UE 115 is unable to successfully decode the downlink channel, where the out-of-sync intervals are determined based on if an estimated link quality corresponding to a hypothetical BLER of the downlink channel is below a threshold (e.g., Q_out threshold) for all configured RLM-RS resources.

If the number of out-of-sync intervals from the first counter is met, the UE 115 may then start a timer (e.g., t310 timer) that allows for the UE 115 to get back in synchronization with the base station 105. If the timer expires before a number of in-sync intervals indicated by a second counter (e.g., n311 counter) is met, the UE 115 may determine that the link (or beam) has failed. The in-sync intervals may be determined based on if an estimated link quality corresponding to the hypothetical BLER of the downlink channel is above a threshold (e.g., Q_in threshold) for at least one RLM-RS resource of all configured RLM-RS resources. Alternatively, if the number of in-sync time intervals is met, the UE 115 may stop the timer and determine that the link has not failed. If the UE 115 determines that the link has failed, the UE 115 may then try to reconnect with the base station via an RRC Connection Reestablishment Request message.

In some cases, the UE 115 may move from one section of a coverage area for the base station 105 to a different section, such that beams and corresponding RLM-RSs used to determine the synchronization between the UE 115 and the base station 105 may not be ideal. For example, as shown above in Table 1, the number of links available for RLM is typically greater than the configured RLM-RS resource (e.g., L>X), so when the UE 115 moves within the coverage of the base station 105, the initial beams and RLM-RS resources configured for RLM may not apply to the new beams that the UE 115 observes from the base station 105 in a new section because the number of RLM-RS resources is limited. Accordingly, the UE 115 may reconfigure the initial beams and RLM-RS resources used for RLM in order to prevent false out-of-sync events (and possibly declare a radio link failure) since the UE 115 is still in the coverage area of the base station 105. Some reconfigurations may utilize control elements (e.g., MAC control elements (MAC-CEs)) to dynamically activate or deactivate RLM-RSs. However, explicitly indicating the RLM-RS changes via the control elements may not indicate how to address the timers and counters utilized as part of the RLM as described above. For example, if a timer and/or counter should be reset, the RLM timescale may not catch up with the RLM-RS changes. Additionally, if a time and/or counter should not be reset, the effects of the RLM-RS changes may not be accurately captured via the RLM.

Wireless communications system 100 may support efficient techniques for an implicit RLM-RS reconfiguration based on a relationship between RLM and beam management. For example, when a subset of beams with a strongest measured characteristic as indicated in the beam measurement step of the beam management change, the RLM-RS resources may be reconfigured to correspond to the subset of beams. In some cases, the subset of beams may be indicated in the periodic beam report sent by the UE 115 in the beam management. Accordingly, the UE 115 may autonomously reconfigure the RLM-RS resources or reconfigure the RLM-RS resources based on receiving a reconfiguration message from the base station 105 in response to the periodic beam report. Alternatively, a beam monitoring even may trigger the UE 115 to aperiodically transmit an indication of the current subset of beams with the strongest measured characteristic to the base station 105, and the base station 105 may then transmit the reconfiguration message to the UE 115 based on the indication for UE 115 to reconfigure the RLM-RS resources. If the UE 115 autonomously reconfigures the RLM-RS resources, the UE 115 may continue the current timers and counters in order to align with the base station 105. If the UE 115 reconfigures the RLM-RS resources based on the reconfiguration message from the base station 105, then the UE 115 may reset the timers and counters. Additionally or alternatively, the UE 115 may reconfigure the RLM-RS resources based on a successful beam failure recovery. After the successful beam failure recovery occurs, the base station 105 may transmit the reconfiguration message with the new beam indication for the beam failure recovery. Accordingly, the UE 115 may reset the timers and counters for RLM. In some cases, the reconfiguration messages may be transmitted via RRC, such that an implicit RLM-RS reconfiguration is indicated (e.g., the RRC reconfigurations or autonomously at the UE 115 with no signaling from the base station 105).

Figure 2:
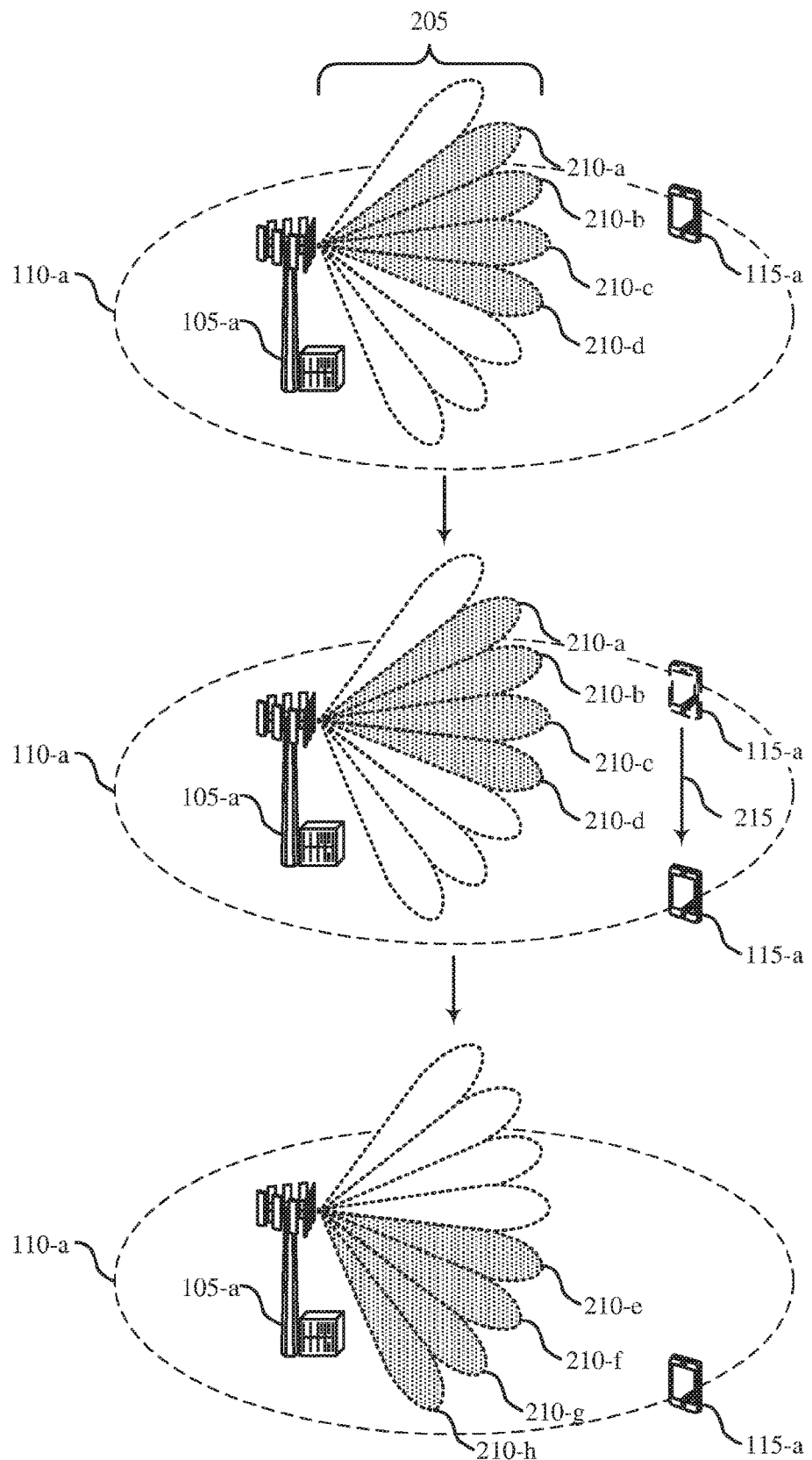
FIGS. 2 and 3 illustrate examples of wireless communications systems that support RLM-RS resource reconfiguration in accordance with aspects of the present disclosure.

FIG. 2 illustrates an example of a wireless communications system 200 that supports radio link monitoring reference signal resource reconfiguration in accordance with aspects of the present disclosure. In some examples, wireless communications system 200 may implement aspects of wireless communications system 100. Wireless communications system 200 may include a base station 105-a and a UE 115-a, which may be examples of corresponding base stations 105 and UEs 115 as described with reference to FIG. 1. Base station 105-a may utilize eight (8) beams 205 for its cell coverage area 110-a (e.g., L=8) and configure four (4) RLM-RS resources 210 on which UE 115-a may perform RLM (e.g., X=4), as described herein.

Base station 105-a may initially configure RLM-RS resources 210-a, 210-b, 210-c, and 210-d for UE 115-a to determine if it is in synchronization with base station 105-a or not, or to perform other radio link monitoring procedures. However, in some cases, UE 115-a may move into another area of coverage area 110-a by a movement 215. Accordingly, RLM-RS resources 210-a, 210-b, 210-c, and 210-d may no longer be ideal for UE 115-a to perform RLM. For example, since UE 115-a is no longer in the direction of the beams that correspond to RLM-RS resources 210-a, 210-b, 210-c, and 210-d, UE 115-a may start generating out-of-sync events by not being able to correctly decode downlink channels (e.g., PDCCHs) from RLM-RS resources 210-a, 210-b, 210-c, and 210-d. As such, UE 115-a may determine and indicate a radio link failure even though it is still located in coverage area 110-a of base station 105-a. UE 115-a may then attempt an RRC reconnection, which may unnecessarily cost power consumption and processing power. In some cases, to prevent such occurrences, RLM-RS resources may be reconfigured to RLM-RS resources 210-e, 210-f, 210-g, and 210-h, and the reconfiguration may be based on a beam management procedure.

In addition to RLM, UE 115-a may be continually performing beam management while communicating with base station 105-a, as described above. As such, characteristics of beams 205 may be measured by UE 115-a and reported to base station 105-a periodically. Within the report, UE 115-a may indicate a subset of beams 205 with a strongest quality characteristic (e.g., signal strength). The number of beams 205 in the subset (M) may be indicated by base station 105 via RRC messaging. After reporting these M strongest beams, the RLM-RS resources 210 may be reconfigured based on the M strongest beams. For example, initially, RLM-RS resources 210-a, 210-b, 210-c, and 210-d may correspond to the four (4) strongest beams from base station 105-a. However, after the movement 215, the beams 205 corresponding to RLM-RS resources 210-e, 210-f, 210-g, and 210-h may be the four (4) strongest beams from base station 105-a and may, accordingly, be reconfigured.

In some cases, UE 115-a may reconfigure RLM-RS resources 210 autonomously with no signaling from base station 105-a. As such, UE 115-a may continue any current timers and counters associated with RLM synchronization (e.g., t310 timer, counter n310, counter n311). Alternatively, after receiving the indication of the M strongest beams in the periodic beam report, base station 105-a may transmit an RLM-RS reconfiguration message to UE 115-a via RRC messaging, and UE 115-a may reconfigure RLM-RS resources 210 accordingly. In such cases, UE 115-a may reset any current timers and counters associated with RLM synchronization after receiving the RLM-RS reconfiguration message. As such, in both cases, the configured RLM-RS resources 210 may be a subset of reference signals configured for beam management.

Alternatively, instead of reporting the M strongest beams periodically in the beam report, a beam monitoring event (BM) may trigger UE 115-a to report the M strongest beams aperiodically. In some cases, the beam monitoring event trigger may be based on a single or group measurement for the RLM-RS resources (e.g., NR-SS or CSI-RS) after filtering (e.g., L1 filtering). For example, the beam monitoring event trigger may include a candidate beam of the beams 205 having a quality characteristic that exceeds a threshold (e.g., BM1), a candidate beam of the beams 205 having a quality characteristic that exceeds by an offset a quality characteristic of one of the RLM-RS resources 210 (e.g., BM2), a candidate beam of the beams 205 having a quality characteristic that exceeds by an offset a second threshold while one of the RLM-RS resources 210 has a quality characteristic that falls below a third threshold (e.g., BM3). In some cases, the criteria for each event (e.g., BM1, BM2, and BM3) may be satisfied during at least a time to trigger the event, where the time to trigger may be configured independently for each BM.

After the BM is triggered, UE 115-a may report the M strongest beams to base station 105-a in an uplink channel (e.g., physical uplink control channel (PUCCH) or physical uplink shared channel (PUSCH)). Base station 105-a may then transmit the RLM-RS reconfiguration message in response to the reported M strongest beams via RRC messaging, where the reconfigured RLM-RS reconfigured resources correspond to the M strongest beams. Accordingly, this aperiodic even trigger update and report may reduce latency cause by the periodical beam monitor and reporting as described above. After receiving the RLM-RS reconfiguration message, UE 115-a may reset any current timers and counters associated with RLM synchronization.

Figure 3:
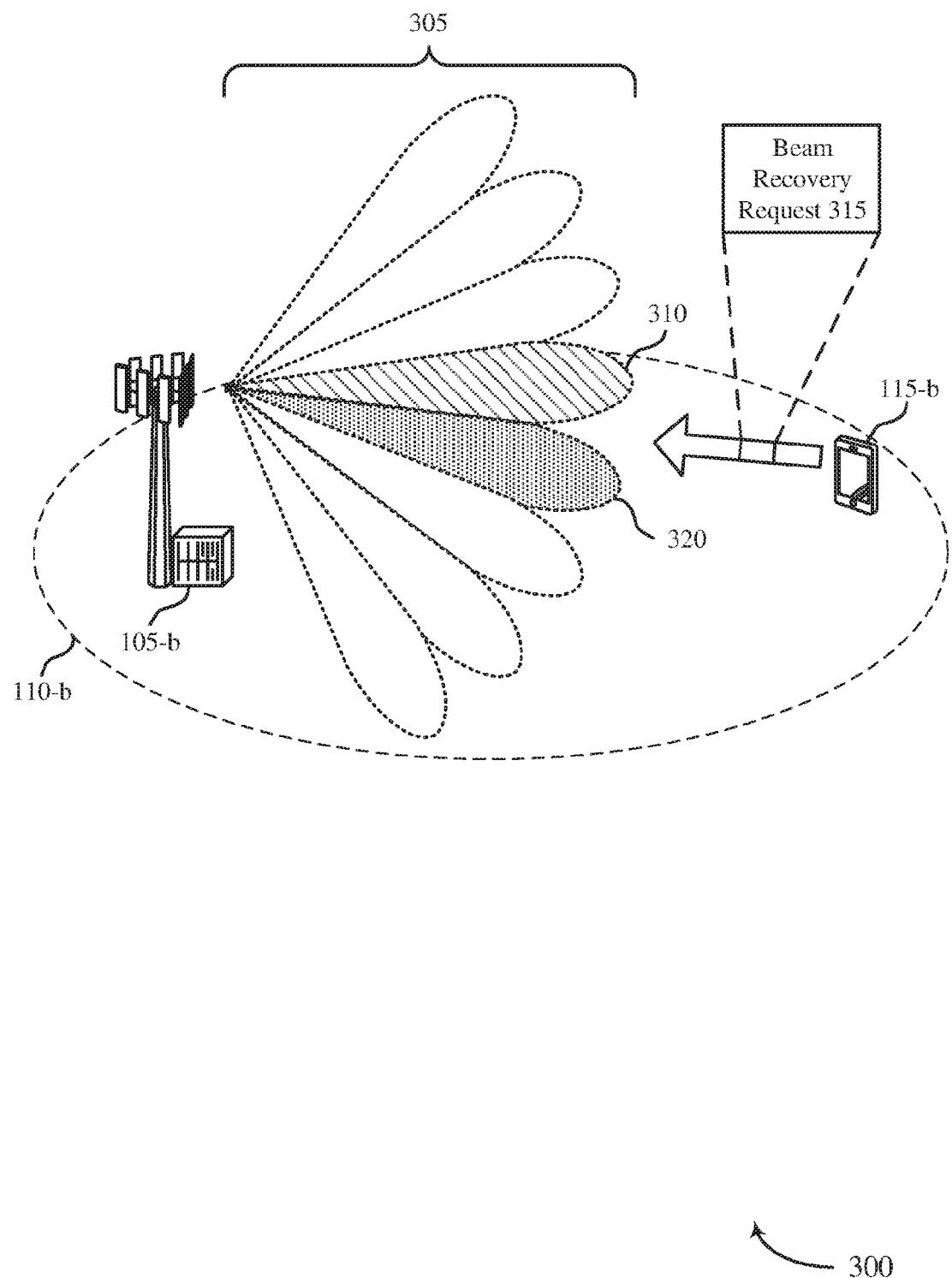

FIG. 3 illustrates an example of a wireless communications system 300 that supports radio link monitoring reference signal resource reconfiguration in accordance with aspects of the present disclosure. In some examples, wireless communications system 300 may implement aspects of wireless communications systems 100 and/or 200. Wireless communications system 300 may include a base station 105-b and a UE 115-b, which may be examples of corresponding base stations 105 and UEs 115 as described with reference to FIGS. 1-2. Base station 105-b may include beams 305 that cover a coverage area 110-b.

In some cases, UE 115-b may initially receive downlink transmissions from base station 105-b on beam 310. However, as described above, UE 115-b may detect a beam failure for beam 310 (e.g., from a hypothetical PDCCH BLER on beam 310 is above a threshold). Accordingly, UE 115-b may identify a candidate beam 320 for switching the communications. In some case, candidate beam 320 may be identified based on a measurement criteria by the UE 115 (e.g., L1 reference signal received power (RSRP) for the candidate beam is above a threshold). If multiple candidate beams meet the measurement criteria, the UE 115 may choose candidate beam 320 from the multiple candidate beams. UE 115-b may then transmit a beam recovery request 315 to base station 105-b that includes the identification of candidate beam 320, where beam recovery request 315 is transmitted via a CFRA or CBRA procedure. UE 115-b may then monitor for a recovery response from base station 105-b on candidate beam 320 (e.g., via an RAR message).

Accordingly, if UE 115-a receives the recovery response, candidate beam 320 may be utilized for subsequent communications with base station 105-a. Additionally, as described herein, based on the successful beam failure recovery, base station 105-b may additionally transmit an RLM-RS reconfiguration message, where the reconfigured RLM-RS resources may be based on candidate beam 320. Base station 105-b may transmit the RLM-RS reconfiguration message via RRC messaging. Additionally, after receiving the RLM-RS reconfiguration message, UE 115-b may reset any current timers and counters associated with RLM synchronization.

Figure 4:
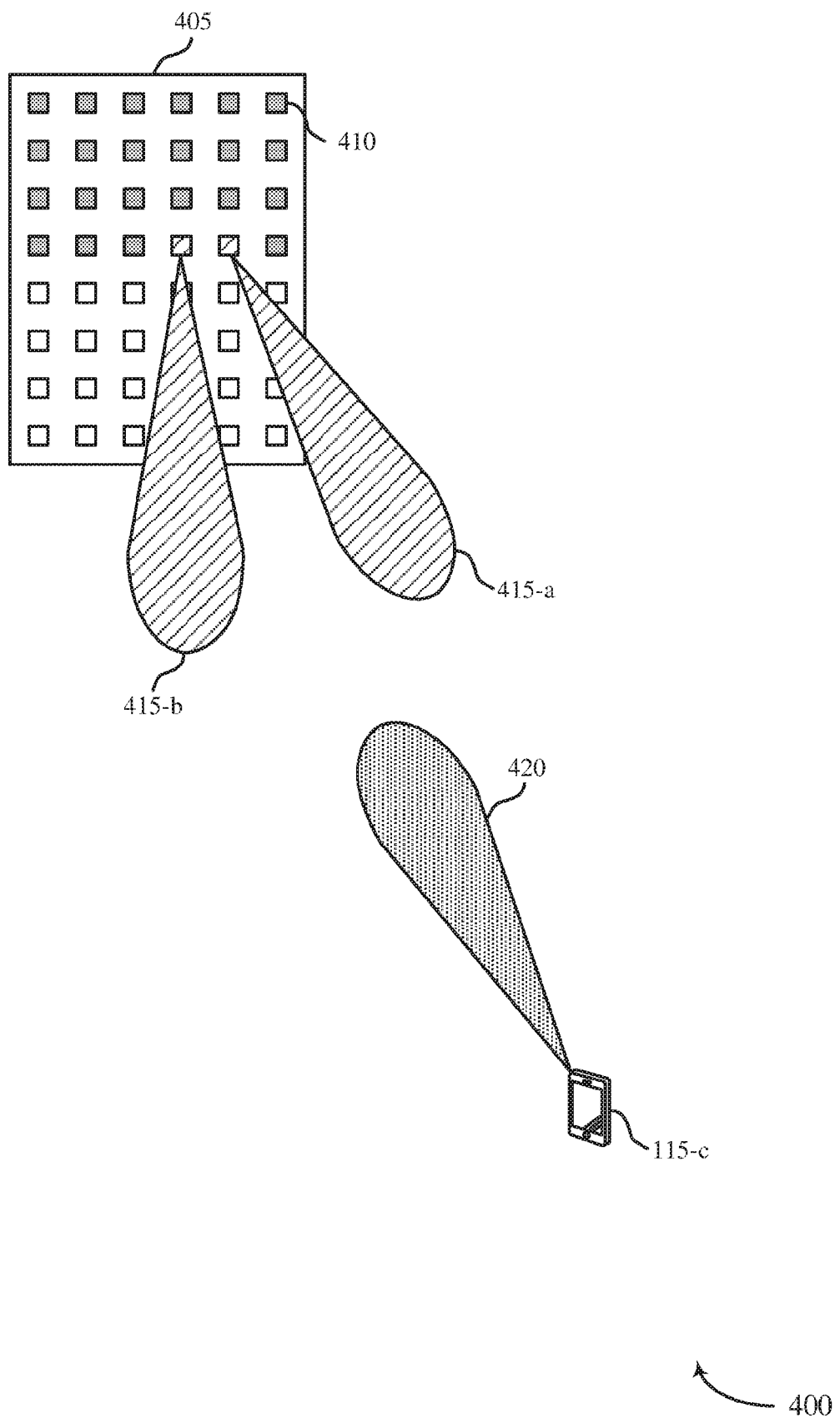
FIG. 4 illustrates an example of a beam management scheme that supports RLM-RS resource reconfiguration in accordance with aspects of the present disclosure.

FIG. 4 illustrates an example of a beam management scheme 400 that supports radio link monitoring reference signal resource reconfiguration in accordance with aspects of the present disclosure. In some examples, beam management scheme 400 may implement aspects of wireless communications systems 100, 200 and/or 300. A UE 115-c may receive one or more beamformed downlink beams 415 from an antenna array 405 that includes individual antennas 410, where UE 115-c may be an example of a UE 115 as described above with reference to FIGS. 1-3. In some cases, the antenna array 405 may be part of a base station 105, which may be an example of a corresponding device as described above with reference to FIGS. 1-3. The base station 105 may apply different weights to each antenna 410 in antenna array 405, in order to produce directional beams to span a coverage area for the base station 105.

UE 115-c may perform beam management for downlink beams 415-a and 415-b from the base station 105. For example, after downlink beams 415 and a receive beam 420 are determined for UE 115-c, UE 115-c may subsequently receive signaling and measure characteristics associated with transmissions on each downlink beam 415 via receive beam 420. In some cases, these characteristics may include signal strength (e.g., RSRP), BLER, phase measurements, bandwidth and sampling rate, etc. Based on the measurements, UE 115-c may determine a subset (M) of strongest beams and include an indication of the subset along with the measured characteristics in a periodic beam report to the base station 105. As described herein, the base station 105 may utilize the subset of strongest beams in order to determine to reconfigure RLM-RS resources for UE 115-c.

Figure 5:
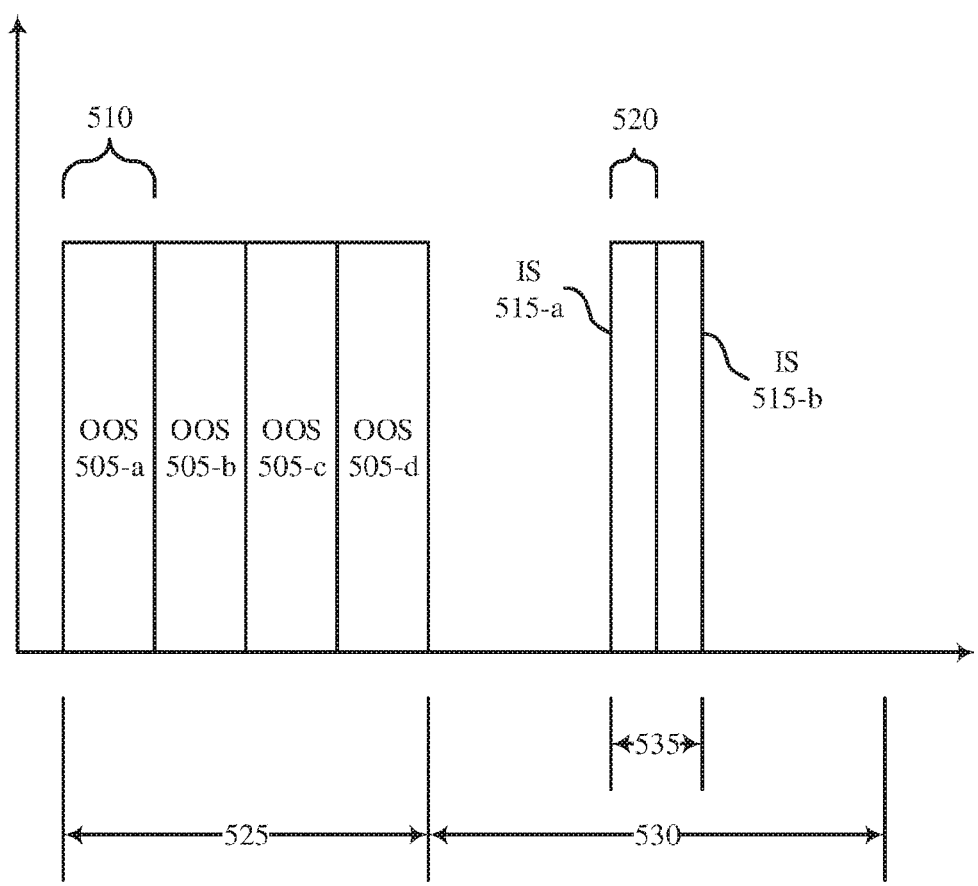
FIG. 5 illustrates an example of an RLM synchronization timer that supports RLM-RS resource reconfiguration in accordance with aspects of the present disclosure.

FIG. 5 illustrates an example of an RLM synchronization timer 500 that supports radio link monitoring reference signal resource reconfiguration in accordance with aspects of the present disclosure. In some examples, RLM synchronization timer 500 may implement aspects of wireless communications systems 100, 200, and/or 300. A UE 115 may utilize RLM synchronization timer 500 to determine if communications with a base station 105 are in-synchronization or not, where the UE 115 and base station 105 may be examples of corresponding UEs 115 and base stations 105 as described with reference to FIGS. 1-4. The base station 105 may configure a set of RLM-RS resources for UE 115 to determine synchronization. Based on a signal strength (e.g., RSRP) of RLM-RSs received from the base station 105, the UE 115 may determine if it can decode a downlink channel from the base station 105 (e.g., PDCCH).

If the UE 115 can consistently decode the downlink channel, then the communications and link (or beam) may be determined to be in-sync. Accordingly, the UE 115 may utilize a timer 530 and one or more counters 525 and 535 to determine the consistency with which the downlink channel can be decoded. For example, a first counter 525 (e.g., n310 counter) may indicate a number of out-of-sync (OOS) intervals 505 that the UE 115 is unable to successfully decode the downlink channel, where the OOS intervals 505 are determined based on if an estimated link quality corresponding to a hypothetical BLER of the downlink channel is below a threshold (e.g., Q_out threshold) for all configured RLM-RS resources. That is, the UE 115 may be unable to successfully decode the downlink channel due to a low received power (e.g., RSRP). Each OOS interval 505 may span a first time interval 510 (e.g., 200 ms intervals), such that each interval indicates a number of consecutive downlink frames (e.g., 20) that the UE 115 cannot decode.

If the number of OOS intervals 505 from the first counter 525 is met, the UE 115 may then start a timer 530 (e.g., t310 timer) that allows for the UE 115 to get back in synchronization with the base station 105. If the timer 530 expires (in seconds) before a number of in-sync (IS) intervals 515 indicated by a second counter 535 (e.g., n311 counter) is met, the UE 115 may determine that the link (or beam) has failed. The IS intervals 515 may be determined based on if an estimated link quality corresponding to the hypothetical BLER of the downlink channel is above a threshold (e.g., Q_in threshold) for at least one RLM-RS resource of all configured RLM-RS resources. Alternatively, if the number of IS time intervals 515 indicated by the second counter 535 is met, the UE 115 may stop the timer and determine that the link has not failed. Each IS interval may span a second time interval 520 (e.g., 100 ms), such that each interval indicates a number of consecutive downlink frames (e.g., 10) that the UE 115 successfully decodes. If the UE 115 determines that the link has failed, the UE 115 may then try to reconnect with the base station via an RRC Connection Reestablishment Request message. However, as described herein, the link may falsely fail due to unnecessary OOS events that are caused by the UE 115 performing RLM on RLM-RS resources that are not in the direction of the UE 115 after a movement by the UE 115. As such, the base station 105 and UE 115 may reconfigure the RLM-RS resources in order to perform efficient RLM. In some cases, if the base station 105 transmits an RLM-RS reconfiguration message to the UE 115, the UE 115 may reset timer 530 and/or counters 525 and 535. Alternatively, if the UE 115 autonomously reconfigures the RLM-RS resources, the UE 115 may continue any current timer 530 and/or counters 525 and 535.

Figure 6:
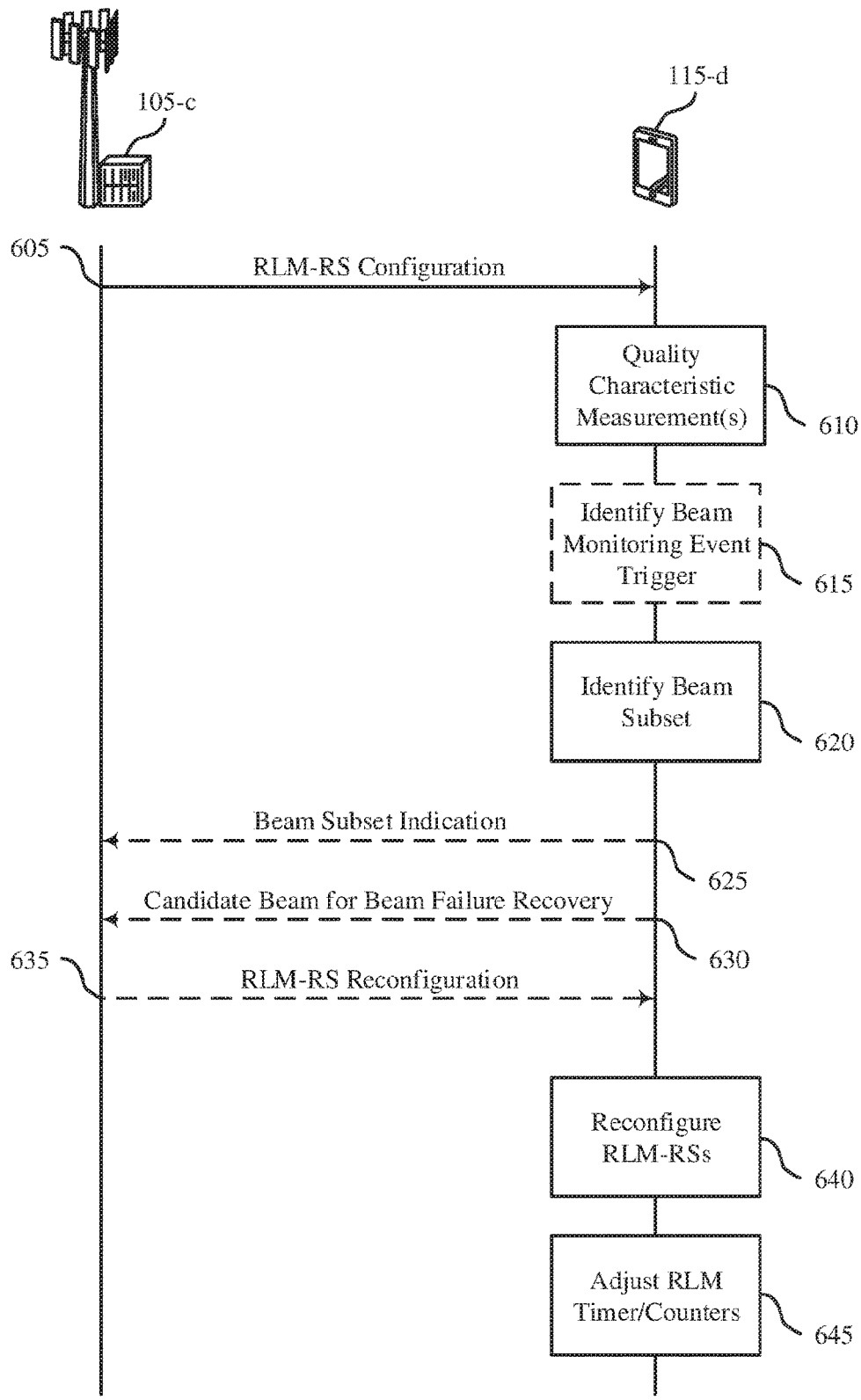
FIG. 6 illustrates an example of a process flow that supports RLM-RS resource reconfiguration in accordance with aspects of the present disclosure.

FIG. 6 illustrates an example of a process flow 600 that supports radio link monitoring reference signal resource reconfiguration in accordance with aspects of the present disclosure. In some examples, process flow 600 may implement aspects of wireless communications systems 100, 200 and/or 300. Process flow 600 may include a base station 105-c and a UE 115-d, which may be examples of corresponding devices as described with reference to FIGS. 1-5. UE 115-d may perform RLM on one or more RLM-RSs received from base station 105-c to ensure synchronization and determine radio link failures.

In the following description of the process flow 600, the operations between UE 115-d and base station 105-c may be performed in different orders or at different times. Certain operations may also be left out of the process flow 600, or other operations may be added to the process flow 600. It is to be understood that while UE 115-d and base station 105-c are shown performing a number of the operations of process flow 600, any wireless device may perform the operations shown.

At 605, UE 115-d may receive, from base station 105-c, an RLM-RS resource configuration for a set of RLM-RS resources. Additionally, UE 115-d may receive an indication for a number of candidate beams (e.g., M) for the subset of the one or more candidate beams via RRC messaging (e.g., an indication for a number of candidate beams for including when measuring a quality characteristic for the RLM-RS resources).

At 610, UE 115-d may measure the quality characteristic of one or more candidate beams, where the one or more candidate beams are different than the set of RLM-RS resources. In some cases, the UE 115-d may perform periodic beam monitoring based on a beam monitoring configuration and measure the quality characteristic according to the periodicity of the beam monitoring configuration.

At 615, UE 115-d may identify a beam monitoring event trigger based on the measuring. In some cases, the beam monitoring event trigger may include a candidate beam of the one or more candidate beams having a quality characteristic that exceeds a threshold, a candidate beam of the one or more candidate beams having a quality characteristic that exceeds by an offset a quality characteristic of a resource of the set of RLM-RS resources, a candidate beam of the one or more candidate beams having a quality characteristic that exceeds by an offset a second threshold while a resource of the set of RLM-RS resources has a quality characteristic that falls below a third threshold.

At 620, UE 115-d may identify a subset of the one or more candidate beams with a highest quality characteristic measurement, where the subset is based on the number of candidate beams to be reconfigured received at 605.

At 625, UE 115-d may transmit, to base station 105-c, an indication of the identified subset of candidate beams. In some cases, UE 115-d may transmit this indication of the subset of the one or more candidate beams with the highest quality characteristic measurement based on identifying the beam monitoring event trigger at 615. Additionally, in some cases, UE 115-d may transmit the indication of the identified subset of candidate beams periodically to base station 105-c.

Additionally or alternatively, at 630, UE 115-d may transmit, to base station 105-c, an indication of a candidate beam for beam failure recovery.

At 635, UE 115-d may receive, from base station 105-c, an RLM-RS reconfiguration message. In some cases, base station 105-c may transmit the RLM-RS reconfiguration message based on the received indication of the identified subset of candidate beams at 625. Additionally or alternatively, base station 105-c may transmit the RLM-RS reconfiguration message based on the received candidate beam indication at 630. UE 115-d may receive the RLM-RS reconfiguration message from base station 105-c via RRC messaging.

At 640, UE 115-d may reconfigure the set of RLM-RS resources. In some cases, UE 115-d may autonomously reconfigure the set of RLM-RS resources to correspond to the identified subset of candidate beams with the highest quality characteristic measurement. Alternatively, the UE 115-d may reconfigure the set of RLM-RS resources based on receiving the RLM-RS reconfiguration message at 635. Accordingly, the set of RLM-RS resources may be reconfigured via RRC messaging.

At 645, UE 115-d may continue or reset a timer and counters associated with RLM synchronization based on reconfiguring the set of RLM-RS resources. For example, if UE 115-d autonomously reconfigures the set of RLM-RS resources, UE 115-d may continue the timer and counters associated with RLM synchronization. Alternatively, if UE 115-d reconfigures the set of RLM-RS resources based on receiving the RLM-RS reconfiguration message from base station 105-c, UE 115-d may reset the timer and the counters associated with RLM synchronization.

Figure 7:
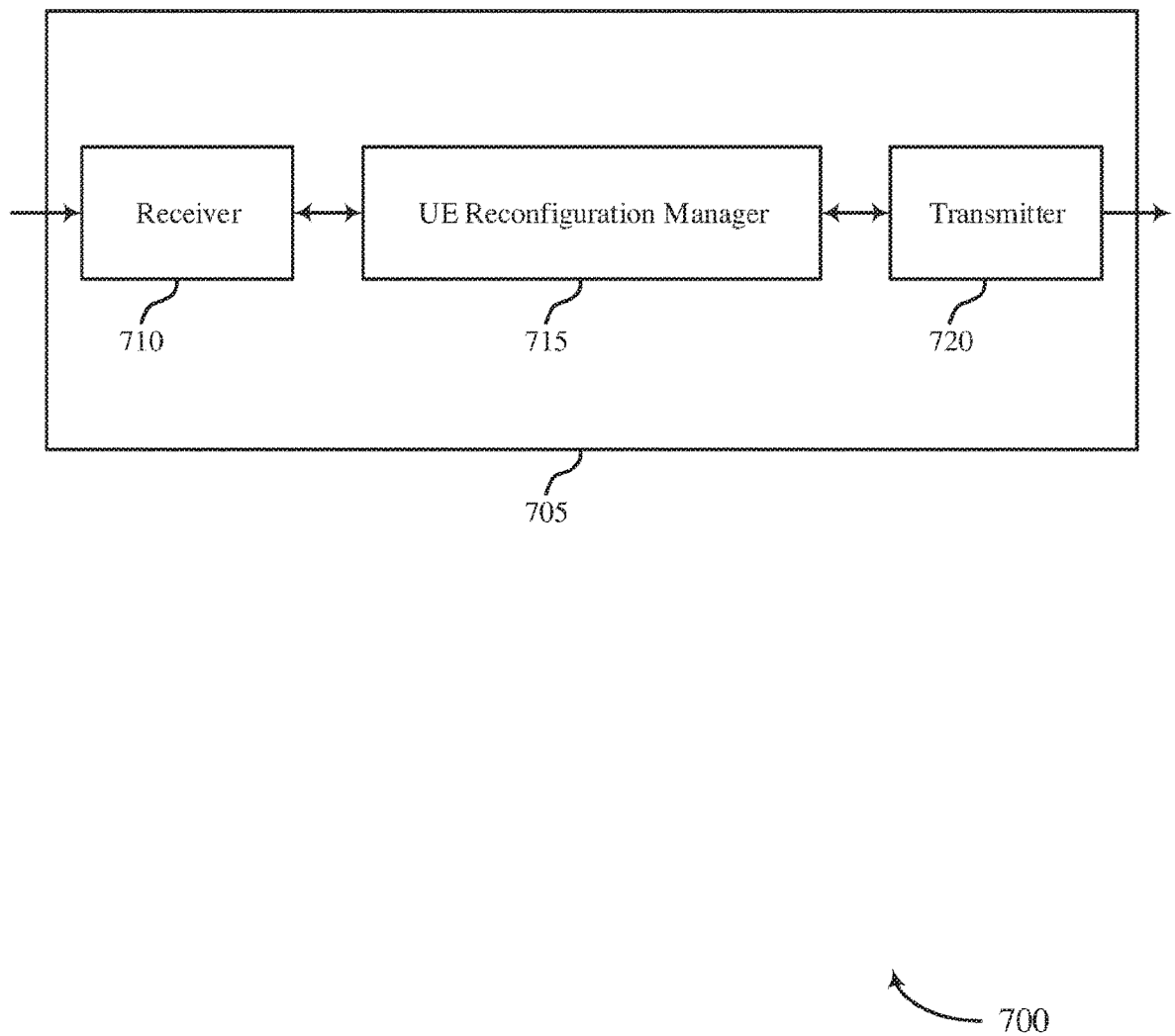
FIGS. 7 and 8 show block diagrams of devices that support RLM-RS resource configuration in accordance with aspects of the present disclosure.

FIG. 7 shows a block diagram 700 of a device 705 that supports RLM-RS resource reconfiguration in accordance with aspects of the present disclosure. The device 705 may be an example of aspects of a UE 115 as described herein. The device 705 may include a receiver 710, a UE reconfiguration manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to RLM-RS resource reconfiguration, etc.). Information may be passed on to other components of the device 705. The receiver 710 may be an example of aspects of the transceiver 1020 described with reference to FIG. 10. The receiver 710 may utilize a single antenna or a set of antennas.

The UE reconfiguration manager 715 may receive an RLM-RS resource configuration for a set of RLM-RS resources. The UE reconfiguration manager 715 may then measure a quality characteristic of one or more candidate beams, where the one or more candidate beams are different than the set of RLM-RS resources. Accordingly, the UE reconfiguration manager 715 may reconfigure the set of RLM-RS resources based on the measuring. Additionally or alternatively, the UE reconfiguration manager 715 may transmit an indication of a candidate beam for beam failure recovery. Accordingly, the UE reconfiguration manager 715 may receive an RLM-RS reconfiguration message based on the indicated candidate beam. The UE reconfiguration manager 715 may be an example of aspects of the UE reconfiguration manager 1010 described herein.

The UE reconfiguration manager 715, or its sub-components, may be implemented in hardware, code (e.g., software or firmware) executed by a processor, or any combination thereof. If implemented in code executed by a processor, the functions of the UE reconfiguration manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE reconfiguration manager 715, or its sub-components, may be physically located at various positions, including being distributed such that portions of functions are implemented at different physical locations by one or more physical components. In some examples, the UE reconfiguration manager 715, or its sub-components, may be a separate and distinct component in accordance with various aspects of the present disclosure. In some examples, the UE reconfiguration manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
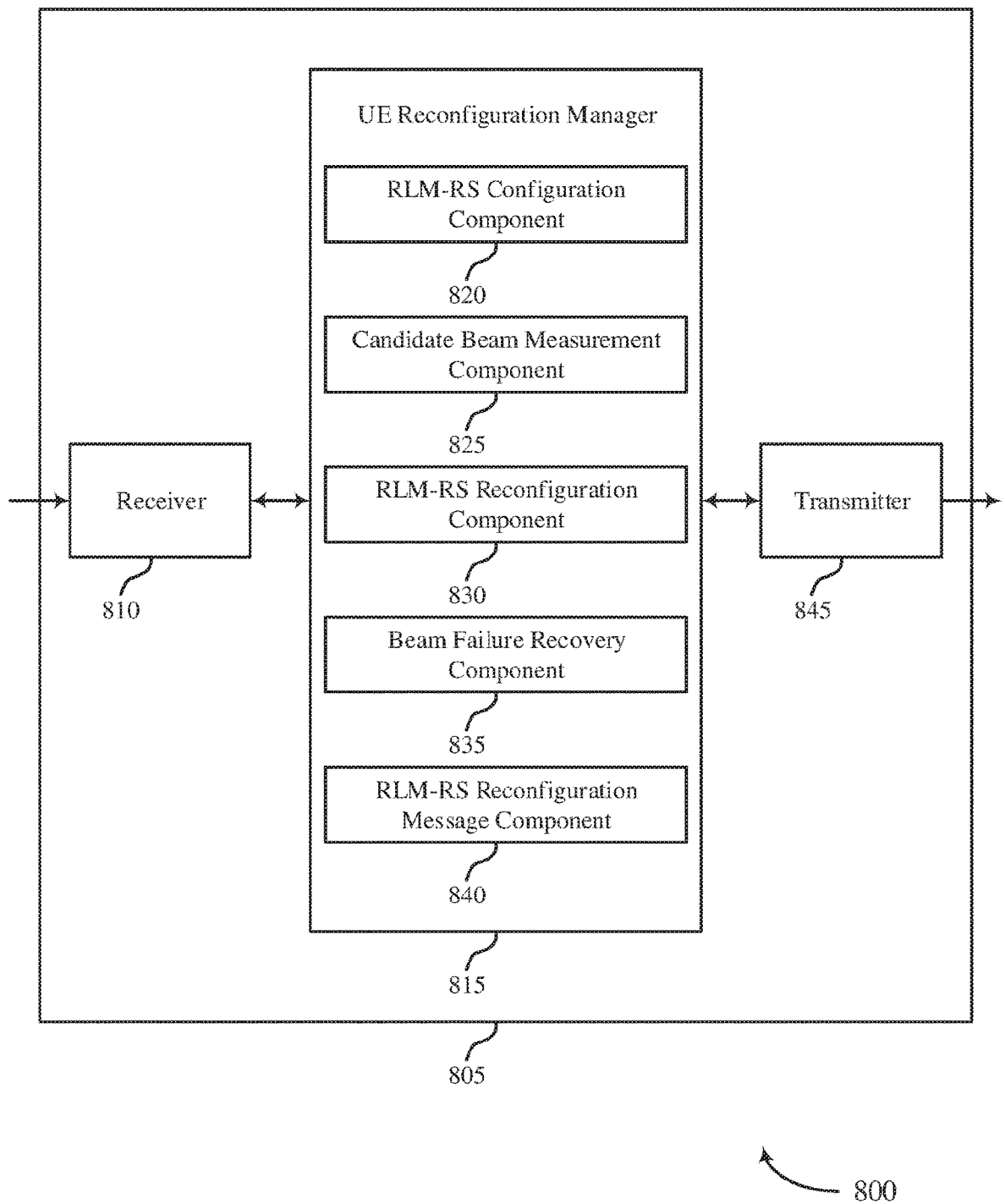

FIG. 8 shows a block diagram 800 of a device 805 that supports RLM-RS resource reconfiguration in accordance with aspects of the present disclosure. The device 805 may be an example of aspects of a device 705 or a UE 115 as described herein. The device 805 may include a receiver 810, a UE reconfiguration manager 815, and a transmitter 845. The device 805 may also include a processor. Each of these components may be in communication with one another (e.g., via one or more buses).

The receiver 810 may receive information such as packets, user data, or control information associated with various information channels (e.g., control channels, data channels, and information related to RLM-RS resource reconfiguration, etc.). Information may be passed on to other components of the device 805. The receiver 810 may be an example of aspects of the transceiver 1020 described with reference to FIG. 10. The receiver 810 may utilize a single antenna or a set of antennas.

The UE reconfiguration manager 815 may be an example of aspects of the UE reconfiguration manager 715 as described herein. The UE reconfiguration manager 815 may include an RLM-RS configuration component 820, a candidate beam measurement component 825, an RLM-RS reconfiguration component 830, a beam failure recovery component 835, and an RLM-RS reconfiguration message component 840. The UE reconfiguration manager 815 may be an example of aspects of the UE reconfiguration manager 1010 described herein.

The RLM-RS configuration component 820 may receive an RLM-RS resource configuration for a set of RLM-RS resources.

The candidate beam measurement component 825 may measure a quality characteristic of one or more candidate beams, where the one or more candidate beams are different than the set of RLM-RS resources.

The RLM-RS reconfiguration component 830 may reconfigure the set of RLM-RS resources based on the measuring.

The beam failure recovery component 835 may transmit an indication of a candidate beam for beam failure recovery.

The RLM-RS reconfiguration message component 840 may receive an RLM-RS reconfiguration message based on the indicated candidate beam.

The transmitter 845 may transmit signals generated by other components of the device 805. In some examples, the transmitter 845 may be collocated with a receiver 810 in a transceiver module. For example, the transmitter 845 may be an example of aspects of the transceiver 1020 described with reference to FIG. 10. The transmitter 845 may utilize a single antenna or a set of antennas.

Figure 9:
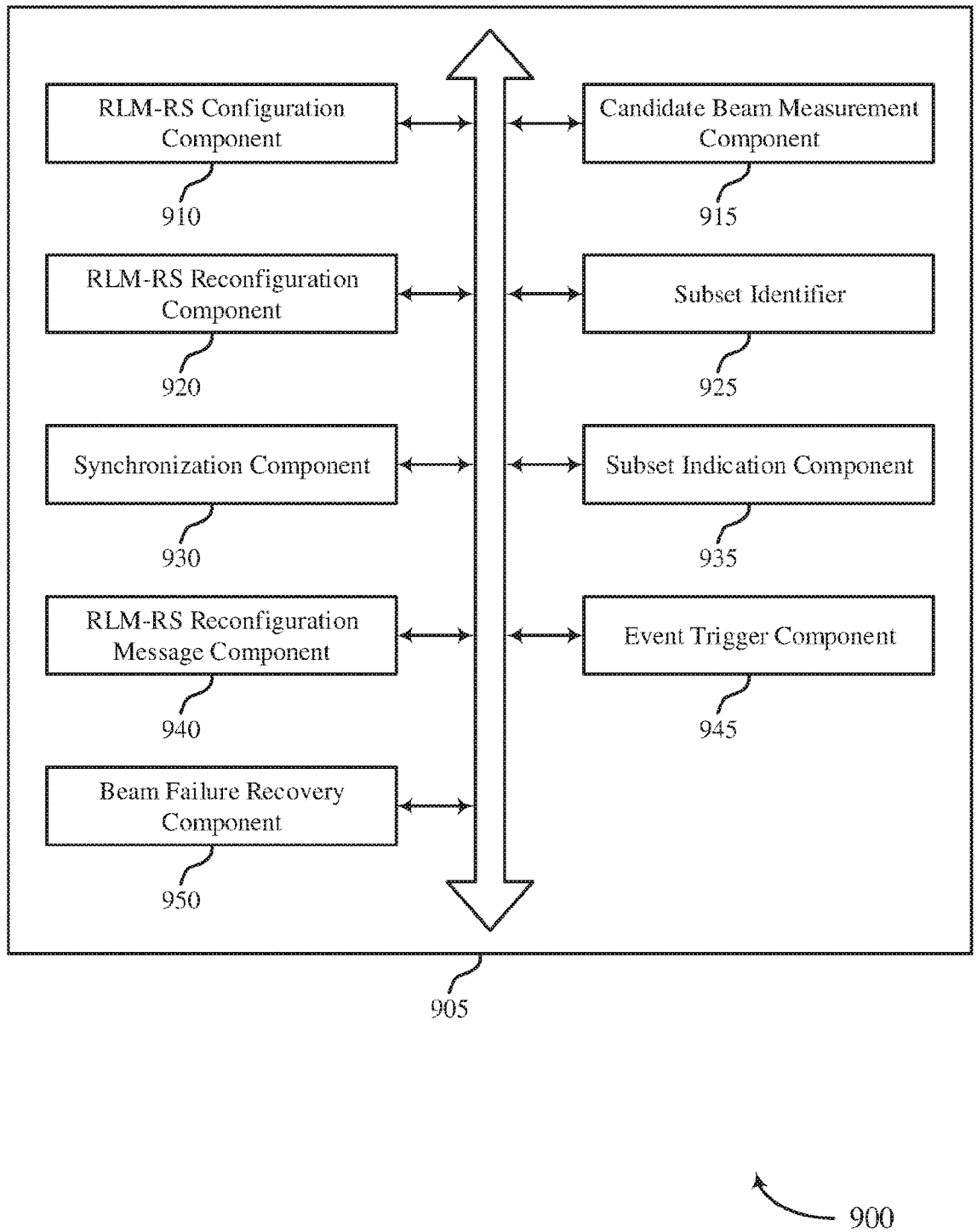
FIG. 9 shows a block diagram of a user equipment (UE) reconfiguration manager that supports RLM-RS resource configuration in accordance with aspects of the present disclosure.

FIG. 9 shows a block diagram 900 of a UE reconfiguration manager 905 that supports RLM-RS resource reconfiguration in accordance with aspects of the present disclosure. The UE reconfiguration manager 905 may be an example of aspects of a UE reconfiguration manager 715, a UE reconfiguration manager 815, or a UE reconfiguration manager 1010 described herein. The UE reconfiguration manager 905 may include an RLM-RS configuration component 910, a candidate beam measurement component 915, an RLM-RS reconfiguration component 920, a subset identifier 925, a synchronization component 930, a subset indication component 935, an RLM-RS reconfiguration message component 940, an event trigger component 945, and a beam failure recovery component 950. Each of these modules may communicate, directly or indirectly, with one another (e.g., via one or more buses).

The RLM-RS configuration component 910 may receive an RLM-RS resource configuration for a set of RLM-RS resources.

The candidate beam measurement component 915 may measure a quality characteristic of one or more candidate beams, where the one or more candidate beams are different than the set of RLM-RS resources.

In some examples, the candidate beam measurement component 915 may perform periodic beam monitoring based on a beam monitoring configuration.

The RLM-RS reconfiguration component 920 may reconfigure the set of RLM-RS resources based on the measuring. In some examples, the RLM-RS reconfiguration component 920 may reconfigure the set of RLM-RS resources to correspond to the identified subset of candidate beams. In some cases, the set of RLM-RS resources are reconfigured via RRC messaging.

The subset identifier 925 may identify a subset of the one or more candidate beams with a highest quality characteristic measurement. In some examples, the subset identifier 925 may receive an indication for a number of candidate beams for the subset of the one or more candidate beams via RRC messaging.

The synchronization component 930 may continue a timer and a counter associated with RLM synchronization based on reconfiguring the set of RLM-RS resources autonomously. In some examples, the synchronization component 930 may reset a timer and a counter associated with RLM synchronization based on receiving the RLM-RS reconfiguration message. In some cases, the one or more timers associated with RLM synchronization include at least a T310 timer and the one or more counters associated with RLM synchronization include at least an N310 counter and N311 counter.

The subset indication component 935 may transmit an indication of the identified subset of candidate beams. In some examples, the subset indication component 935 may transmit an indication of a subset of the one or more candidate beams with a highest quality characteristic measurement based on identifying a beam monitoring event trigger.

The RLM-RS reconfiguration message component 940 may receive an RLM-RS reconfiguration message based on the indicated candidate beam. In some examples, the RLM-RS reconfiguration message component 940 may receive an RLM-RS reconfiguration message based on the identified subset of candidate beams. In some examples, the RLM-RS reconfiguration message component 940 may receive an RLM-RS reconfiguration message based on the transmitted indication. In some cases, the RLM-RS reconfiguration message is received via RRC messaging.

The event trigger component 945 may identify the beam monitoring event trigger based on the measuring. In some cases, the beam monitoring event trigger may include a candidate beam of the one or more candidate beams having a quality characteristic that exceeds a threshold, a candidate beam of the one or more candidate beams having a quality characteristic that exceeds by an offset a quality characteristic of a resource of the set of RLM-RS resources, a candidate beam of the one or more candidate beams having a quality characteristic that exceeds by an offset a second threshold while a resource of the set of RLM-RS resources has a quality characteristic that falls below a third threshold.

The beam failure recovery component 950 may transmit an indication of a candidate beam for beam failure recovery.

Figure 10:
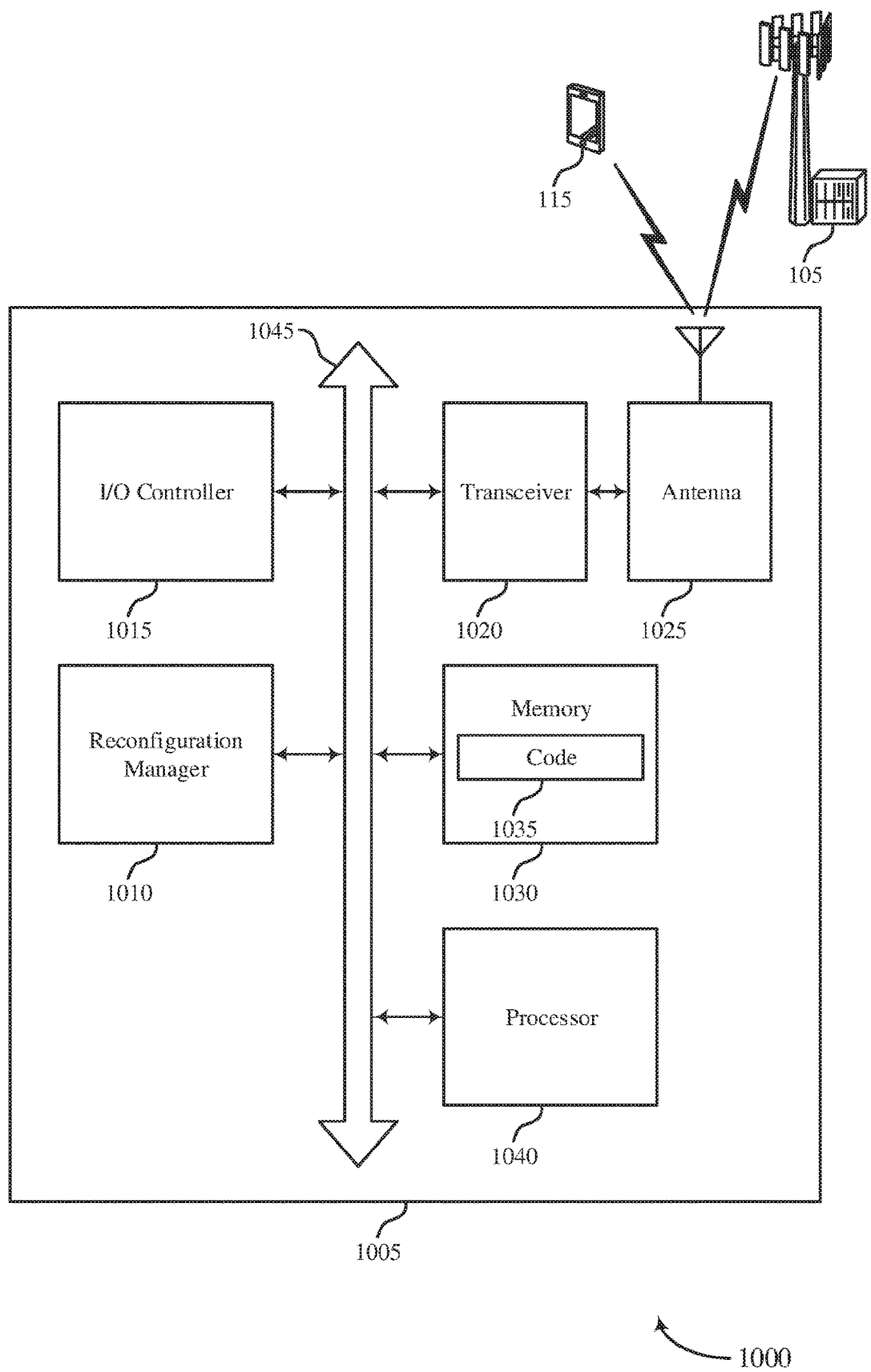
FIG. 10 shows a diagram of a system including a device that supports RLM-RS resource configuration in accordance with aspects of the present disclosure.

FIG. 10 shows a diagram of a system 1000 including a device 1005 that supports RLM-RS resource reconfiguration in accordance with aspects of the present disclosure. The device 1005 may be an example of or include the components of device 705, device 805, or a UE 115 as described herein. The device 1005 may include components for bi-directional voice and data communications including components for transmitting and receiving communications, including a UE reconfiguration manager 1010, an I/O controller 1015, a transceiver 1020, an antenna 1025, memory 1030, and a processor 1040. These components may be in electronic communication via one or more buses (e.g., bus 1045).

The UE reconfiguration manager 1010 may receive an RLM-RS resource configuration for a set of RLM-RS resources, measure a quality characteristic of one or more candidate beams, where the one or more candidate beams are different than the set of RLM-RS resources, and reconfigure the set of RLM-RS resources based on the measuring. The UE reconfiguration manager 1010 may also transmit an indication of a candidate beam for beam failure recovery and receive an RLM-RS reconfiguration message based on the indicated candidate beam.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting RLM-RS resource reconfiguration).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
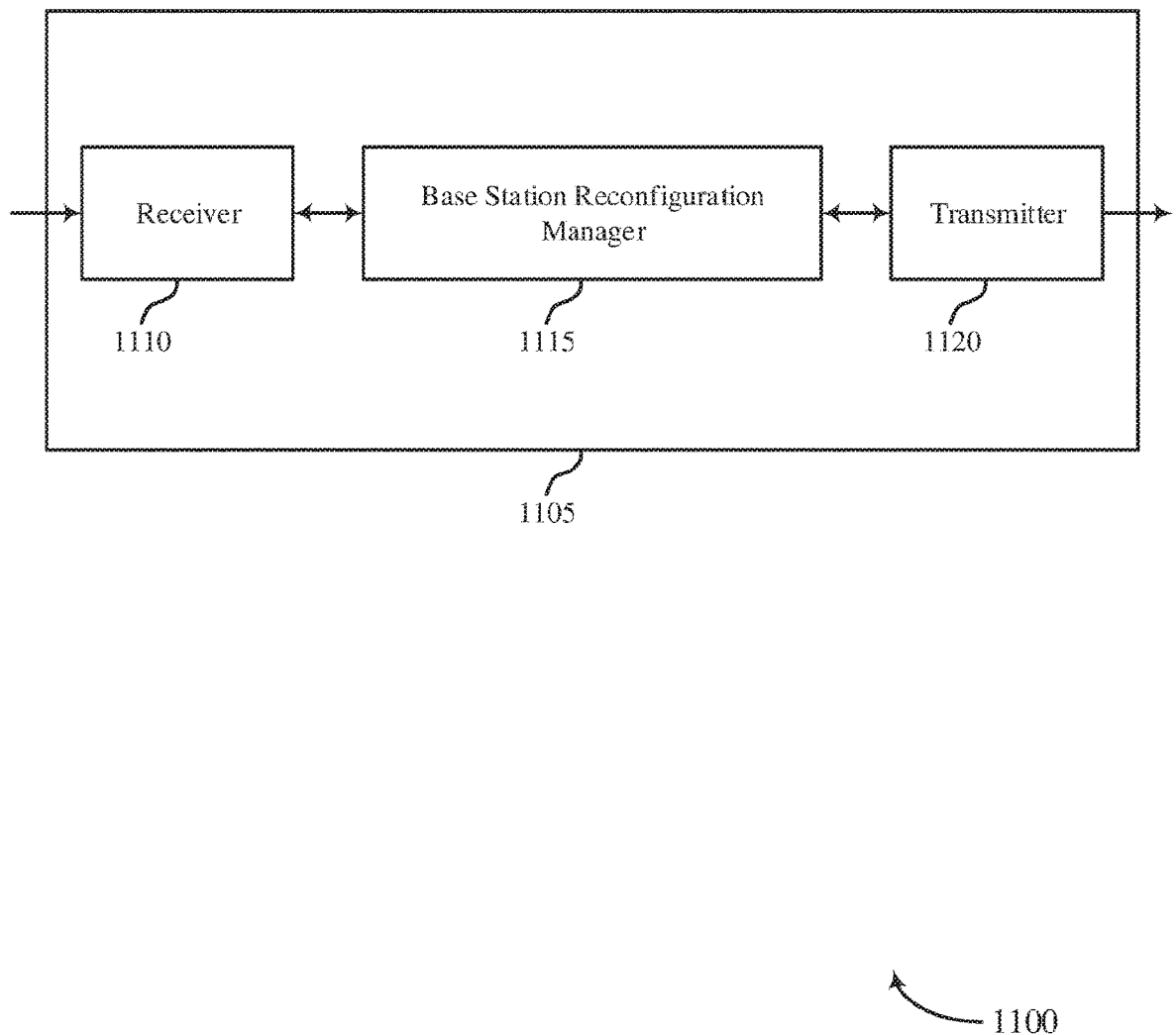
FIGS. 11 and 12 show block diagrams of devices that support RLM-RS resource configuration in accordance with aspects of the present disclosure.

FIG. 11 shows a block diagram 1100 of a device 1105 that supports RLM-RS resource reconfiguration in accordance with aspects of the present disclosure. The device 1105 may be an example of aspects of a base station 105 as described herein. The device 1105 may include a receiver 1110, a base station reconfiguration manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to RLM-RS resource reconfiguration, etc.). Information may be passed on to other components of the device 1105. The receiver 1110 may be an example of aspects of the transceiver 1420 described with reference to FIG. 14. The receiver 1110 may utilize a single antenna or a set of antennas.

The base station reconfiguration manager 1115 may transmit, to a UE, an RLM-RS resource configuration for a set of RLM-RS resources. The base station reconfiguration manager 1115 may then receive an indication of a subset of one or more candidate beams with a highest quality characteristic measurement, where the one or more candidate beams are different than the set of RLM-RS resources. Accordingly, The base station reconfiguration manager 1115 may transmit an RLM-RS reconfiguration message based on the indicated subset of candidate beams. Additionally or alternatively, the base station reconfiguration manager 1115 may receive an indication of a candidate beam for beam failure recovery. As such, the base station reconfiguration manager 1115 may transmit an RLM-RS reconfiguration message based on the indicated candidate beam. The base station reconfiguration manager 1115 may be an example of aspects of the base station reconfiguration manager 1410 described herein.

The base station reconfiguration manager 1115, or its sub-components, may be implemented in hardware, code (e.g., software or firmware) executed by a processor, or any combination thereof. If implemented in code executed by a processor, the functions of the base station reconfiguration manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station reconfiguration manager 1115, or its sub-components, may be physically located at various positions, including being distributed such that portions of functions are implemented at different physical locations by one or more physical components. In some examples, the base station reconfiguration manager 1115, or its sub-components, may be a separate and distinct component in accordance with various aspects of the present disclosure. In some examples, the base station reconfiguration manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
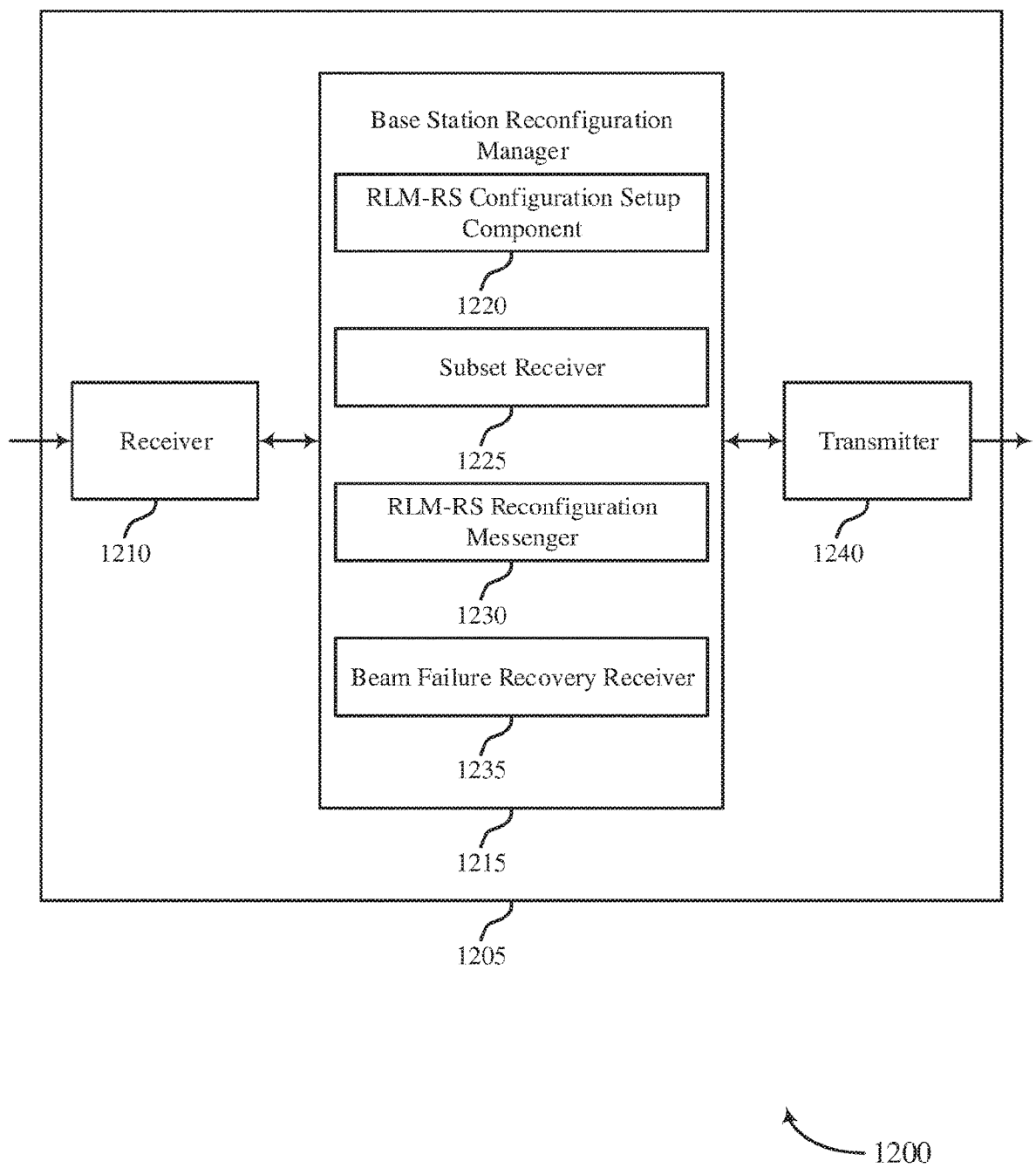

FIG. 12 shows a block diagram 1200 of a device 1205 that supports RLM-RS resource reconfiguration in accordance with aspects of the present disclosure. The device 1205 may be an example of aspects of a device 1105 or a base station 105 as described herein. The device 1205 may include a receiver 1210, a base station reconfiguration manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to RLM-RS resource reconfiguration, etc.). Information may be passed on to other components of the device 1205. The receiver 1210 may be an example of aspects of the transceiver 1420 described with reference to FIG. 14. The receiver 1210 may utilize a single antenna or a set of antennas.

The base station reconfiguration manager 1215 may be an example of aspects of the base station reconfiguration manager 1115 as described herein. The base station reconfiguration manager 1215 may include an RLM-RS configuration setup component 1220, a subset receiver 1225, an RLM-RS reconfiguration messenger 1230, and a beam failure recovery receiver 1235. The base station reconfiguration manager 1215 may be an example of aspects of the base station reconfiguration manager 1410 described herein.

The RLM-RS configuration setup component 1220 may transmit, to a UE, an RLM-RS resource configuration for a set of RLM-RS resources.

The subset receiver 1225 may receive an indication of a subset of one or more candidate beams with a highest quality characteristic measurement, where the one or more candidate beams are different than the set of RLM-RS resources.

The RLM-RS reconfiguration messenger 1230 may transmit an RLM-RS reconfiguration message based on the indicated subset of candidate beams.

The beam failure recovery receiver 1235 may receive an indication of a candidate beam for beam failure recovery. The RLM-RS reconfiguration messenger 1230 may transmit an RLM-RS reconfiguration message based on the indicated candidate beam.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
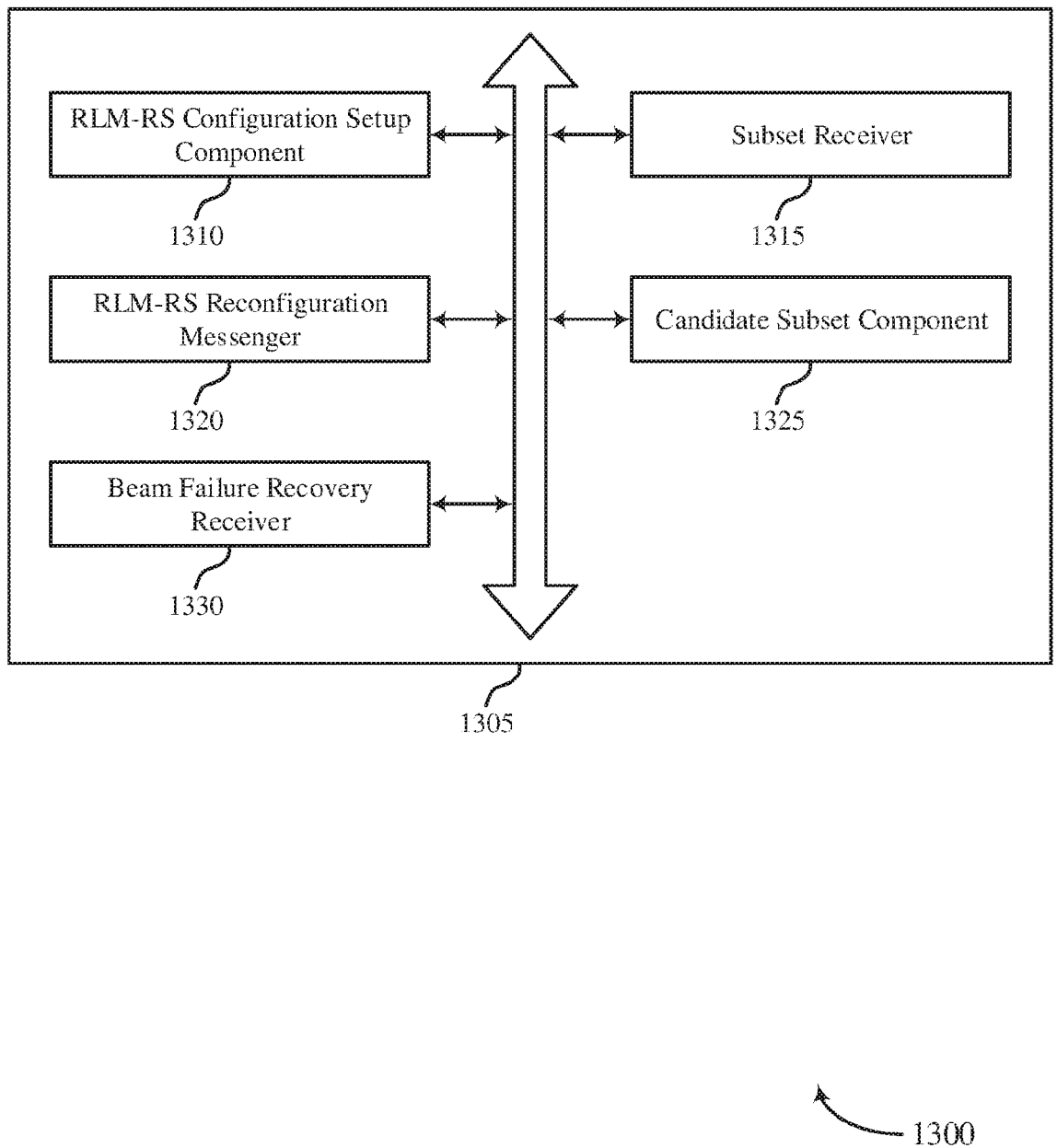
FIG. 13 shows a block diagram of a base station reconfiguration manager that supports RLM-RS resource configuration in accordance with aspects of the present disclosure.

FIG. 13 shows a block diagram 1300 of a base station reconfiguration manager 1305 that supports RLM-RS resource reconfiguration in accordance with aspects of the present disclosure. The base station reconfiguration manager 1305 may be an example of aspects of a base station reconfiguration manager 1115, a base station reconfiguration manager 1215, or a base station reconfiguration manager 1410 described herein. The base station reconfiguration manager 1305 may include an RLM-RS configuration setup component 1310, a subset receiver 1315, an RLM-RS reconfiguration messenger 1320, a candidate subset component 1325, and a beam failure recovery receiver 1330. Each of these modules may communicate, directly or indirectly, with one another (e.g., via one or more buses).

The RLM-RS configuration setup component 1310 may transmit, to a UE, an RLM-RS resource configuration for a set of RLM-RS resources.

The subset receiver 1315 may receive an indication of a subset of one or more candidate beams with a highest quality characteristic measurement, where the one or more candidate beams are different than the set of RLM-RS resources. In some cases, the indication of the subset of one or more candidate beams is received periodically.

The RLM-RS reconfiguration messenger 1320 may transmit an RLM-RS reconfiguration message based on the indicated subset of candidate beams. In some cases, the RLM-RS reconfiguration message is transmitted via RRC messaging.

The candidate subset component 1325 may transmit an indication for a number of candidate beams for the subset of the one or more candidate beams via RRC messaging.

The beam failure recovery receiver 1330 may receive an indication of a candidate beam for beam failure recovery. In some examples, the RLM-RS reconfiguration messenger 1320 may transmit an RLM-RS reconfiguration message based on the indicated candidate beam.

Figure 14:
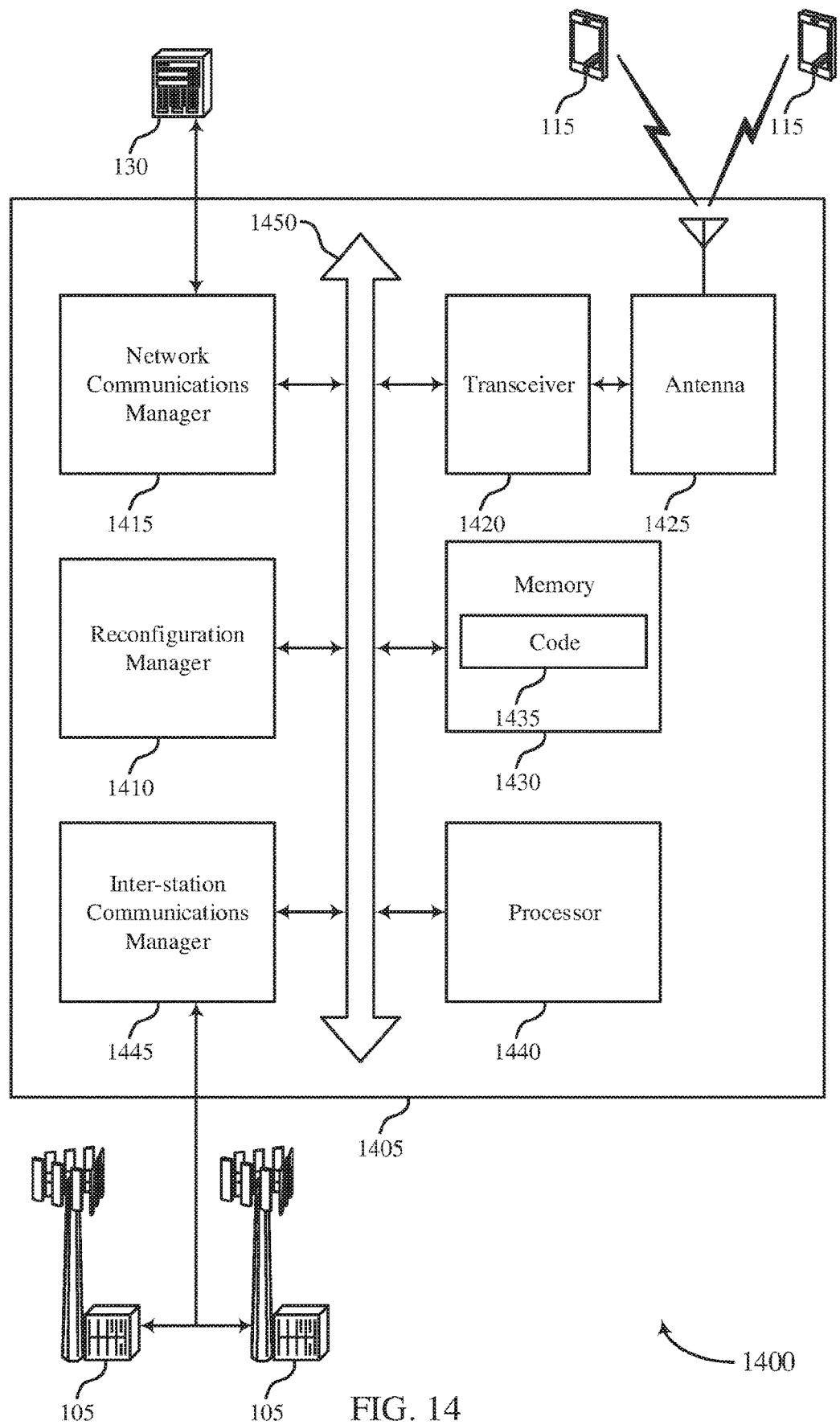
FIG. 14 shows a diagram of a system including a device that supports RLM-RS resource configuration in accordance with aspects of the present disclosure.

FIG. 14 shows a diagram of a system 1400 including a device 1405 that supports RLM-RS resource reconfiguration in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a base station reconfiguration manager 1410, a network communications manager 1415, a transceiver 1420, an antenna 1425, memory 1430, a processor 1440, and an inter-station communications manager 1445. These components may be in electronic communication via one or more buses (e.g., bus 1450).

The base station reconfiguration manager 1410 may transmit, to a UE, an RLM-RS resource configuration for a set of RLM-RS resources, receive an indication of a subset of one or more candidate beams with a highest quality characteristic measurement, where the one or more candidate beams are different than the set of RLM-RS resources, and transmit an RLM-RS reconfiguration message based on the indicated subset of candidate beams. Additionally or alternatively, the base station reconfiguration manager 1410 may receive an indication of a candidate beam for beam failure recovery and transmit an RLM-RS reconfiguration message based on the indicated candidate beam.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device #{device} to perform various functions (e.g., functions or tasks supporting RLM-RS resource reconfiguration).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
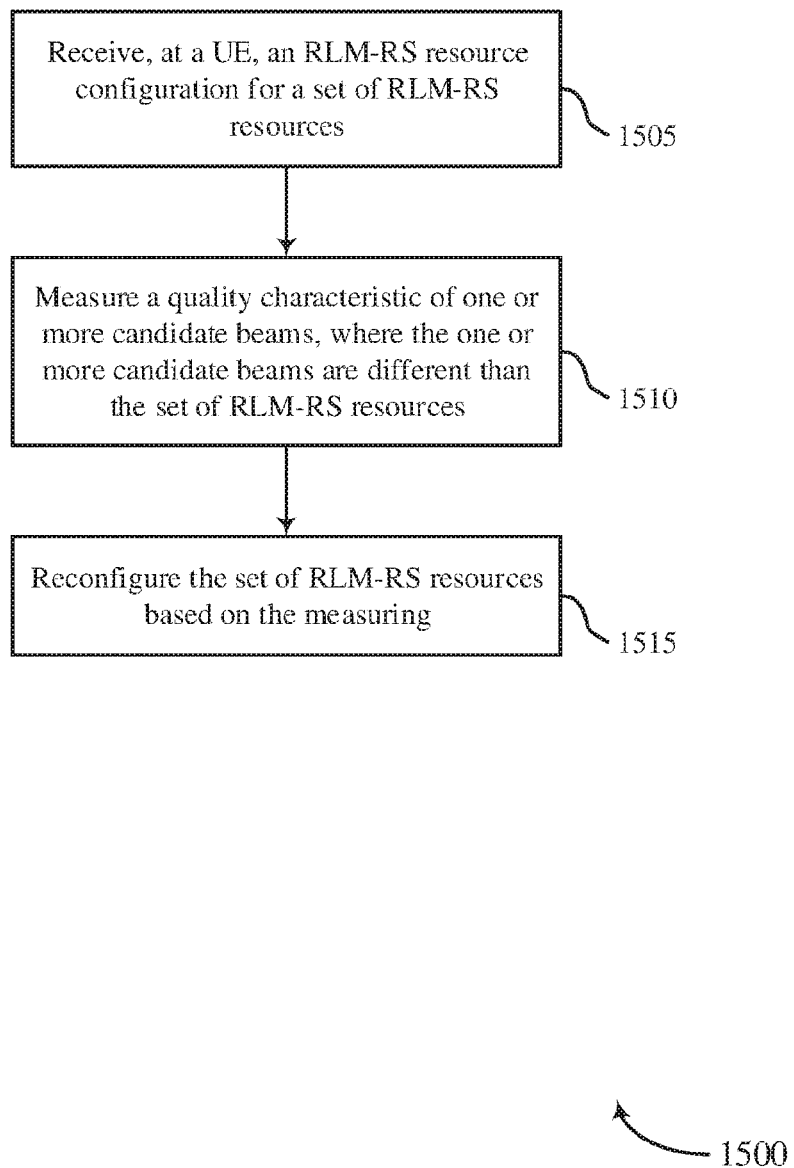
FIGS. 15 through 21 show flowcharts illustrating methods that support RLM-RS resource configuration in accordance with aspects of the present disclosure.

FIG. 15 shows a flowchart illustrating a method 1500 that supports radio link monitoring reference signal resource reconfiguration in accordance with aspects of the present disclosure. The operations of method 1500 may be implemented by a UE 115 or its components as described herein. For example, the operations of method 1500 may be performed by a reconfiguration manager as described with reference to FIGS. 7 to 10. In some examples, a UE may execute a set of instructions to control the functional elements of the UE to perform the functions described below. Additionally or alternatively, a UE may perform aspects of the functions described below using special-purpose hardware.

At 1505, the UE may receive an RLM-RS resource configuration for a set of RLM-RS resources. The operations of 1505 may be performed according to the methods described herein. In some examples, aspects of the operations of 1505 may be performed by a RLM-RS configuration component as described with reference to FIGS. 7 to 10.

At 1510, the UE may measure a quality characteristic of one or more candidate beams, where the one or more candidate beams are different than the set of RLM-RS resources. The operations of 1510 may be performed according to the methods described herein. In some examples, aspects of the operations of 1510 may be performed by a candidate beam measurement component as described with reference to FIGS. 7 to 10.

At 1515, the UE may reconfigure the set of RLM-RS resources based on the measuring. The operations of 1515 may be performed according to the methods described herein. In some examples, aspects of the operations of 1515 may be performed by a RLM-RS reconfiguration component as described with reference to FIGS. 7 to 10.

Figure 16:
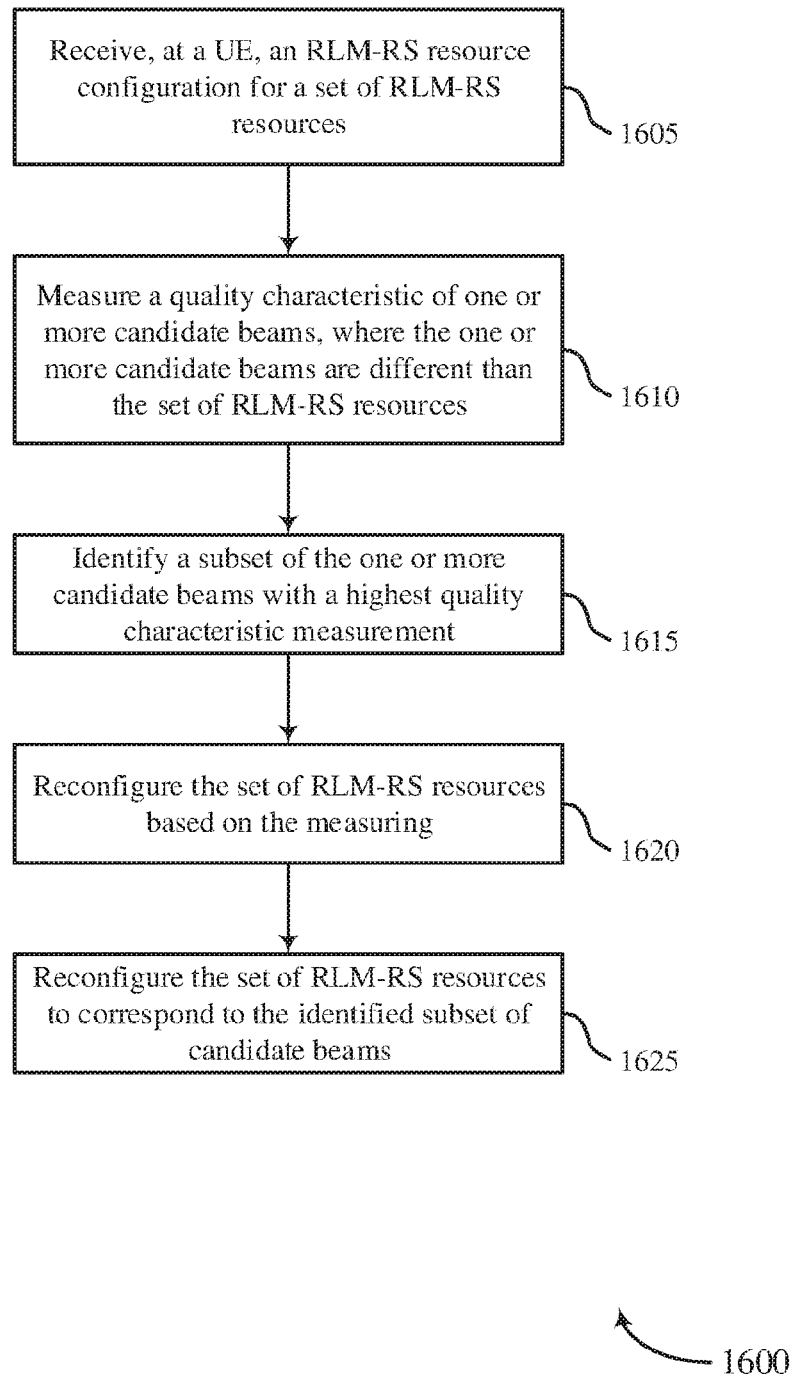

FIG. 16 shows a flowchart illustrating a method 1600 that supports radio link monitoring reference signal resource reconfiguration in accordance with aspects of the present disclosure. The operations of method 1600 may be implemented by a UE 115 or its components as described herein. For example, the operations of method 1600 may be performed by a reconfiguration manager as described with reference to FIGS. 7 to 10. In some examples, a UE may execute a set of instructions to control the functional elements of the UE to perform the functions described below. Additionally or alternatively, a UE may perform aspects of the functions described below using special-purpose hardware.

At 1605, the UE may receive an RLM-RS resource configuration for a set of RLM-RS resources. The operations of 1605 may be performed according to the methods described herein. In some examples, aspects of the operations of 1605 may be performed by a RLM-RS configuration component as described with reference to FIGS. 7 to 10.

At 1610, the UE may measure a quality characteristic of one or more candidate beams, where the one or more candidate beams are different than the set of RLM-RS resources. The operations of 1610 may be performed according to the methods described herein. In some examples, aspects of the operations of 1610 may be performed by a candidate beam measurement component as described with reference to FIGS. 7 to 10.

At 1615, the UE may identify a subset of the one or more candidate beams with a highest quality characteristic measurement. The operations of 1615 may be performed according to the methods described herein. In some examples, aspects of the operations of 1615 may be performed by a subset identifier as described with reference to FIGS. 7 to 10.

At 1620, the UE may reconfigure the set of RLM-RS resources based on the measuring. The operations of 1620 may be performed according to the methods described herein. In some examples, aspects of the operations of 1620 may be performed by a RLM-RS reconfiguration component as described with reference to FIGS. 7 to 10.

At 1625, the UE may reconfigure the set of RLM-RS resources to correspond to the identified subset of candidate beams. The operations of 1625 may be performed according to the methods described herein. In some examples, aspects of the operations of 1625 may be performed by a RLM-RS reconfiguration component as described with reference to FIGS. 7 to 10.

Figure 17:
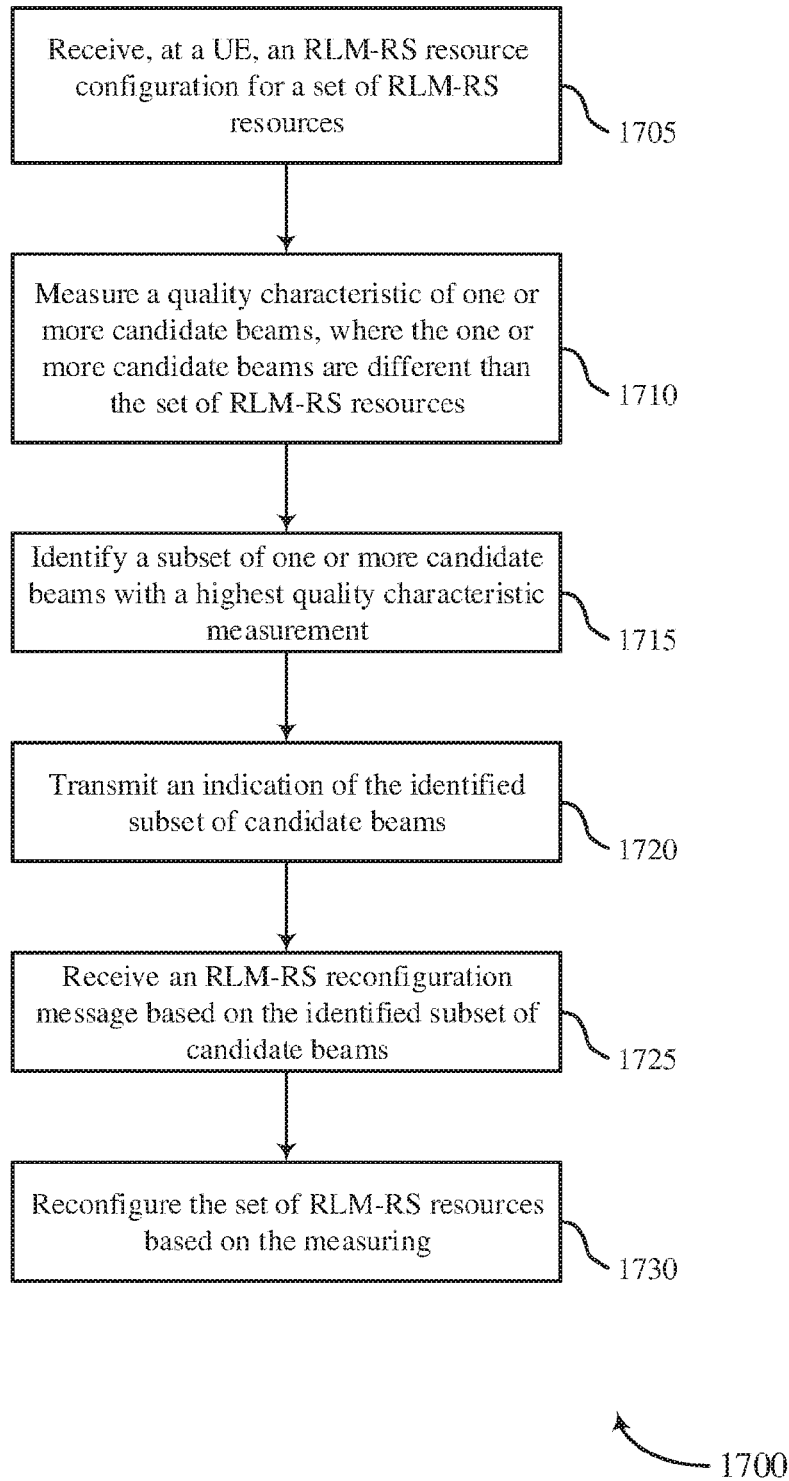

FIG. 17 shows a flowchart illustrating a method 1700 that supports radio link monitoring reference signal resource reconfiguration in accordance with aspects of the present disclosure. The operations of method 1700 may be implemented by a UE 115 or its components as described herein. For example, the operations of method 1700 may be performed by a reconfiguration manager as described with reference to FIGS. 7 to 10. In some examples, a UE may execute a set of instructions to control the functional elements of the UE to perform the functions described below. Additionally or alternatively, a UE may perform aspects of the functions described below using special-purpose hardware.

At 1705, the UE may receive an RLM-RS resource configuration for a set of RLM-RS resources. The operations of 1705 may be performed according to the methods described herein. In some examples, aspects of the operations of 1705 may be performed by a RLM-RS configuration component as described with reference to FIGS. 7 to 10.

At 1710, the UE may measure a quality characteristic of one or more candidate beams, where the one or more candidate beams are different than the set of RLM-RS resources. The operations of 1710 may be performed according to the methods described herein. In some examples, aspects of the operations of 1710 may be performed by a candidate beam measurement component as described with reference to FIGS. 7 to 10.

At 1715, the UE may identify a subset of one or more candidate beams with a highest quality characteristic measurement. The operations of 1715 may be performed according to the methods described herein. In some examples, aspects of the operations of 1715 may be performed by a subset identifier as described with reference to FIGS. 7 to 10.

At 1720, the UE may transmit an indication of the identified subset of candidate beams. The operations of 1720 may be performed according to the methods described herein. In some examples, aspects of the operations of 1720 may be performed by a subset indication component as described with reference to FIGS. 7 to 10.

At 1725, the UE may receive an RLM-RS reconfiguration message based on the identified subset of candidate beams. The operations of 1725 may be performed according to the methods described herein. In some examples, aspects of the operations of 1725 may be performed by a RLM-RS reconfiguration message component as described with reference to FIGS. 7 to 10.

At 1730, the UE may reconfigure the set of RLM-RS resources based on the measuring. The operations of 1730 may be performed according to the methods described herein. In some examples, aspects of the operations of 1730 may be performed by a RLM-RS reconfiguration component as described with reference to FIGS. 7 to 10.

Figure 18:
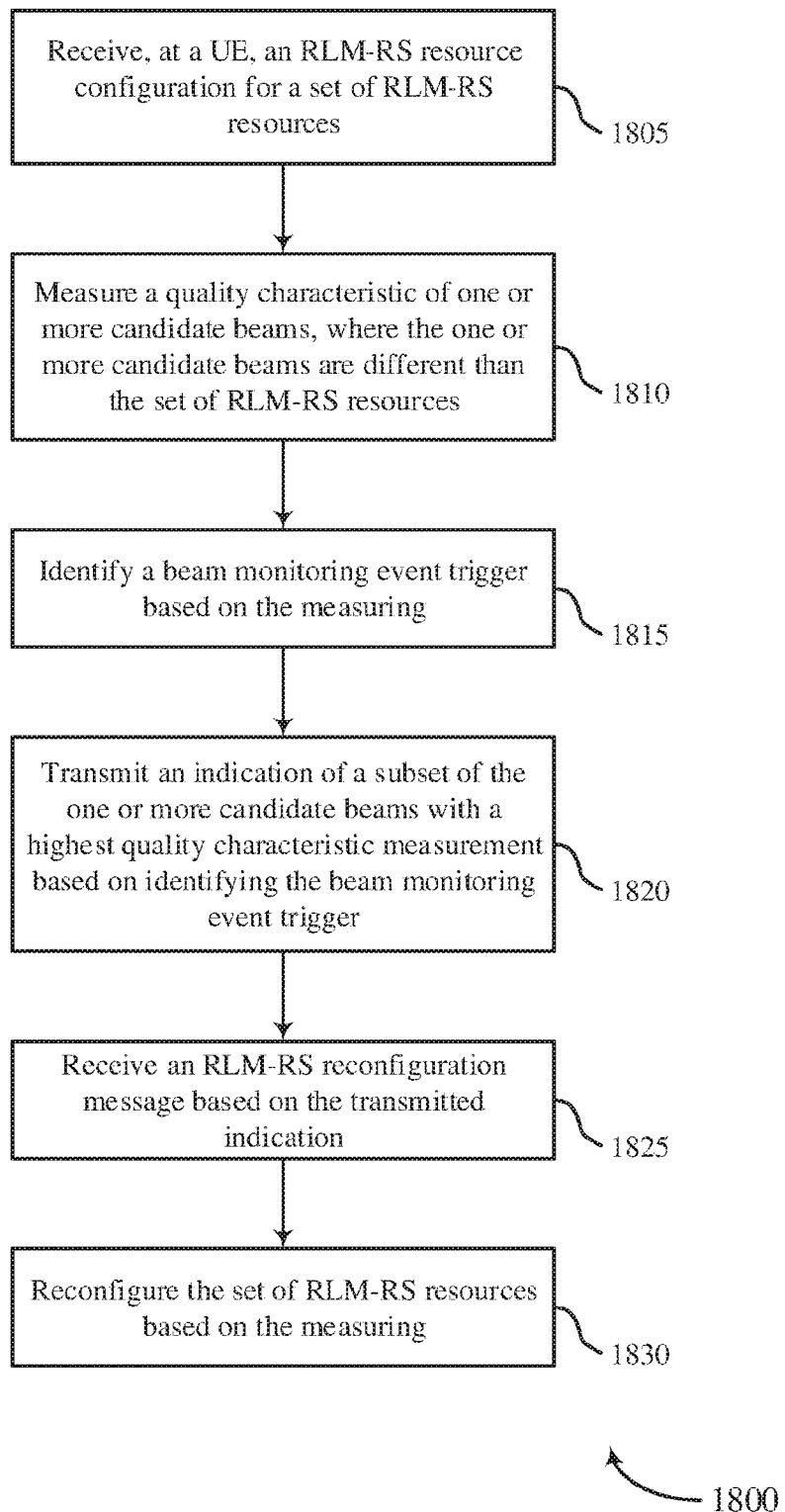

FIG. 18 shows a flowchart illustrating a method 1800 that supports radio link monitoring reference signal resource reconfiguration in accordance with aspects of the present disclosure. The operations of method 1800 may be implemented by a UE 115 or its components as described herein. For example, the operations of method 1800 may be performed by a reconfiguration manager as described with reference to FIGS. 7 to 10. In some examples, a UE may execute a set of instructions to control the functional elements of the UE to perform the functions described below. Additionally or alternatively, a UE may perform aspects of the functions described below using special-purpose hardware.

At 1805, the UE may receive an RLM-RS resource configuration for a set of RLM-RS resources. The operations of 1805 may be performed according to the methods described herein. In some examples, aspects of the operations of 1805 may be performed by a RLM-RS configuration component as described with reference to FIGS. 7 to 10.

At 1810, the UE may measure a quality characteristic of one or more candidate beams, where the one or more candidate beams are different than the set of RLM-RS resources. The operations of 1810 may be performed according to the methods described herein. In some examples, aspects of the operations of 1810 may be performed by a candidate beam measurement component as described with reference to FIGS. 7 to 10.

At 1815, the UE may identify a beam monitoring event trigger based on the measuring. The operations of 1815 may be performed according to the methods described herein. In some examples, aspects of the operations of 1815 may be performed by an event trigger component as described with reference to FIGS. 7 to 10.

At 1820, the UE may transmit an indication of a subset of the one or more candidate beams with a highest quality characteristic measurement based on identifying the beam monitoring event trigger. The operations of 1820 may be performed according to the methods described herein. In some examples, aspects of the operations of 1820 may be performed by a subset indication component as described with reference to FIGS. 7 to 10.

At 1825, the UE may receive an RLM-RS reconfiguration message based on the transmitted indication. The operations of 1825 may be performed according to the methods described herein. In some examples, aspects of the operations of 1825 may be performed by a RLM-RS reconfiguration message component as described with reference to FIGS. 7 to 10.

At 1830, the UE may reconfigure the set of RLM-RS resources based on the measuring. The operations of 1830 may be performed according to the methods described herein. In some examples, aspects of the operations of 1830 may be performed by a RLM-RS reconfiguration component as described with reference to FIGS. 7 to 10.

Figure 19:
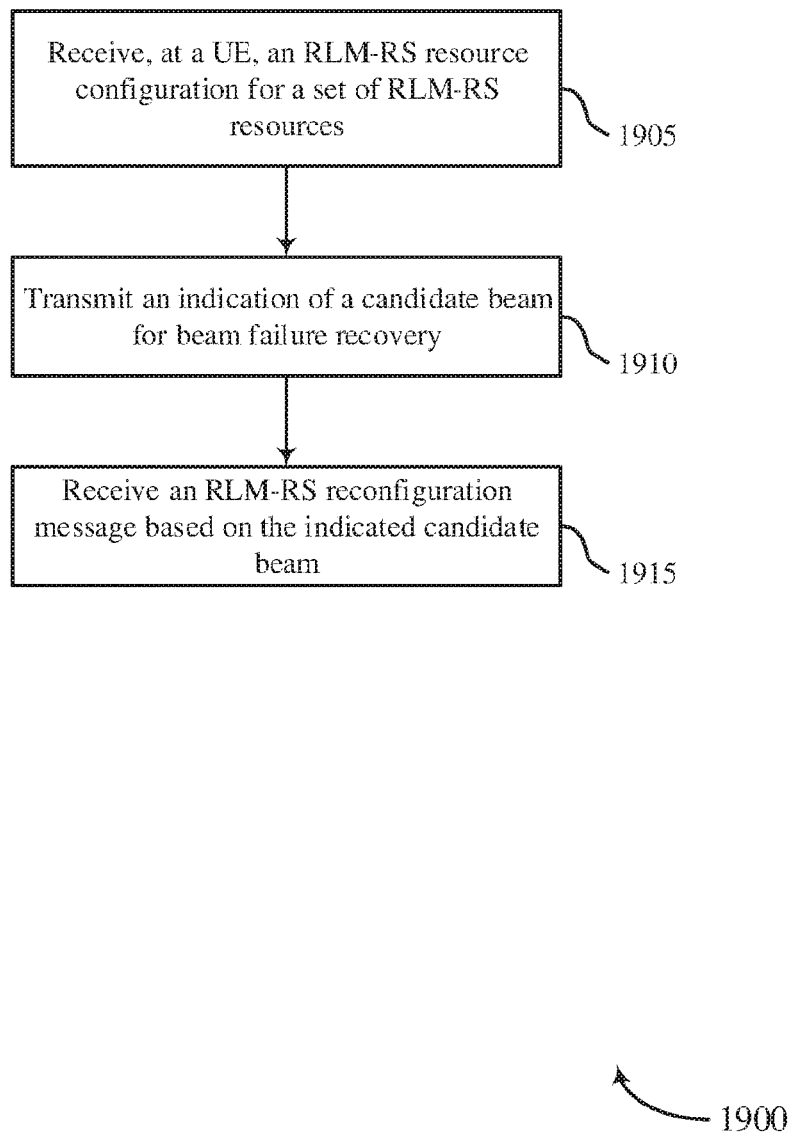

FIG. 19 shows a flowchart illustrating a method 1900 that supports radio link monitoring reference signal resource reconfiguration in accordance with aspects of the present disclosure. The operations of method 1900 may be implemented by a UE 115 or its components as described herein. For example, the operations of method 1900 may be performed by a reconfiguration manager as described with reference to FIGS. 7 to 10. In some examples, a UE may execute a set of instructions to control the functional elements of the UE to perform the functions described below. Additionally or alternatively, a UE may perform aspects of the functions described below using special-purpose hardware.

At 1905, the UE may receive an RLM-RS resource configuration for a set of RLM-RS resources. The operations of 1905 may be performed according to the methods described herein. In some examples, aspects of the operations of 1905 may be performed by a RLM-RS configuration component as described with reference to FIGS. 7 to 10.

At 1910, the UE may transmit an indication of a candidate beam for beam failure recovery. The operations of 1910 may be performed according to the methods described herein. In some examples, aspects of the operations of 1910 may be performed by a beam failure recovery component as described with reference to FIGS. 7 to 10.

At 1915, the UE may receive an RLM-RS reconfiguration message based on the indicated candidate beam. The operations of 1915 may be performed according to the methods described herein. In some examples, aspects of the operations of 1915 may be performed by a RLM-RS reconfiguration message component as described with reference to FIGS. 7 to 10.

Figure 20:
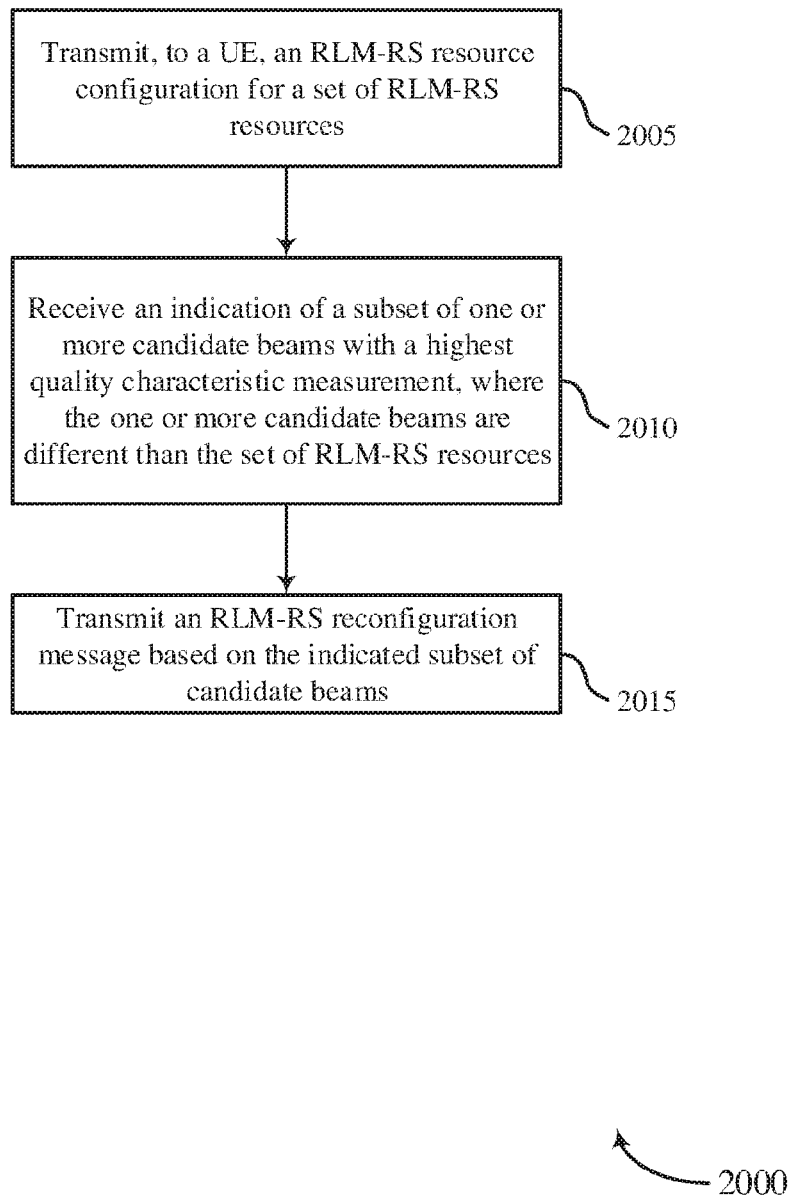

FIG. 20 shows a flowchart illustrating a method 2000 that supports radio link monitoring reference signal resource reconfiguration in accordance with aspects of the present disclosure. The operations of method 2000 may be implemented by a base station 105 or its components as described herein. For example, the operations of method 2000 may be performed by a reconfiguration manager as described with reference to FIGS. 11 to 14. In some examples, a base station may execute a set of instructions to control the functional elements of the base station to perform the functions described below. Additionally or alternatively, a base station may perform aspects of the functions described below using special-purpose hardware.

At 2005, the base station may transmit, to a UE, an RLM-RS resource configuration for a set of RLM-RS resources. The operations of 2005 may be performed according to the methods described herein. In some examples, aspects of the operations of 2005 may be performed by a RLM-RS configuration setup component as described with reference to FIGS. 11 to 14.

At 2010, the base station may receive an indication of a subset of one or more candidate beams with a highest quality characteristic measurement, where the one or more candidate beams are different than the set of RLM-RS resources. The operations of 2010 may be performed according to the methods described herein. In some examples, aspects of the operations of 2010 may be performed by a subset receiver as described with reference to FIGS. 11 to 14.

At 2015, the base station may transmit an RLM-RS reconfiguration message based on the indicated subset of candidate beams. The operations of 2015 may be performed according to the methods described herein. In some examples, aspects of the operations of 2015 may be performed by a RLM-RS reconfiguration messenger as described with reference to FIGS. 11 to 14.

Figure 21:
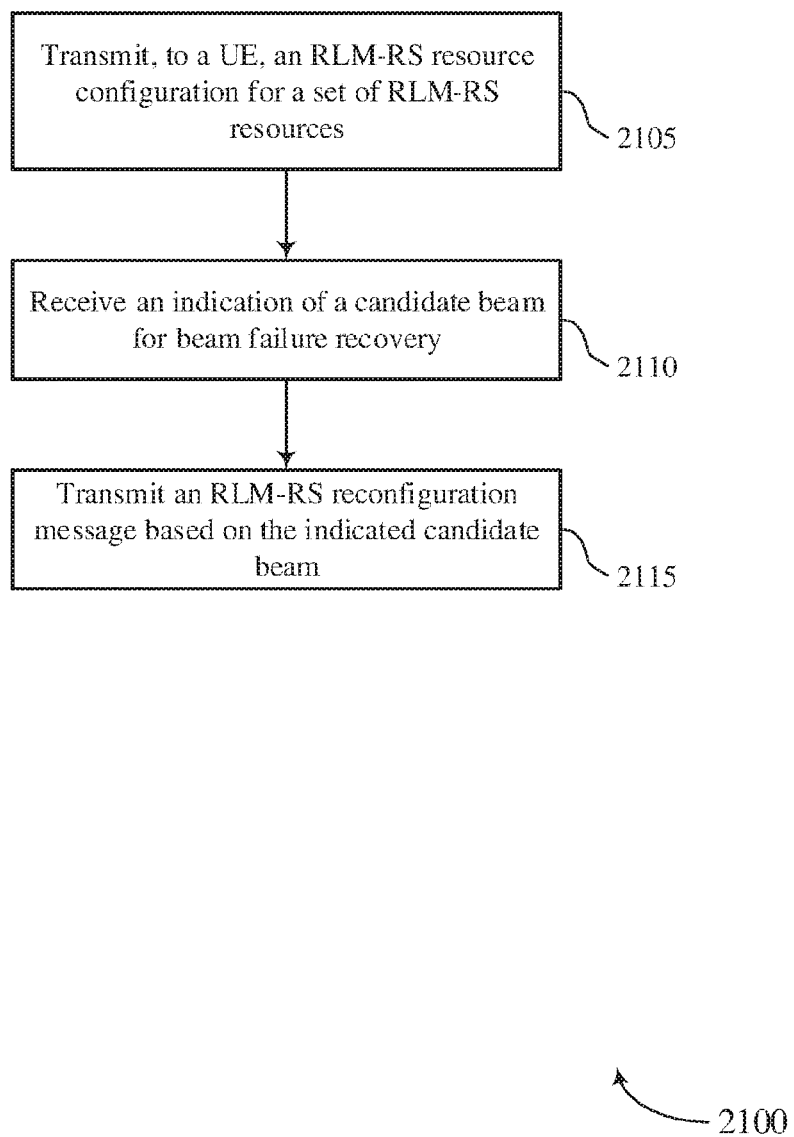

FIG. 21 shows a flowchart illustrating a method 2100 that supports radio link monitoring reference signal resource reconfiguration in accordance with aspects of the present disclosure. The operations of method 2100 may be implemented by a base station 105 or its components as described herein. For example, the operations of method 2100 may be performed by a reconfiguration manager as described with reference to FIGS. 11 to 14. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE, an RLM-RS resource configuration for a set of RLM-RS resources. The operations of 2105 may be performed according to the methods described herein. In some examples, aspects of the operations of 2105 may be performed by a RLM-RS configuration setup component as described with reference to FIGS. 11 to 14.

At 2110, the base station may receive an indication of a candidate beam for beam failure recovery. The operations of 2110 may be performed according to the methods described herein. In some examples, aspects of the operations of 2110 may be performed by a beam failure recovery receiver as described with reference to FIGS. 11 to 14.

At 2115, the base station may transmit an RLM-RS reconfiguration message based on the indicated candidate beam. The operations of 2115 may be performed according to the methods described herein. In some examples, aspects of the operations of 2115 may be performed by a RLM-RS reconfiguration messenger as described with reference to FIGS. 11 to 14.

Embodiment 1: A method of wireless communications, comprising: receiving, at a UE, a RLM-RS resource configuration for a set of RLM-RS resources, measuring a quality characteristic of one or more candidate beams, wherein the one or more candidate beams are different than the set of RLM-RS resources, and reconfiguring the set of RLM-RS resources based at least in part on the measuring.

Embodiment 2: The method of embodiment 1, further comprising: identifying a subset of the one or more candidate beams with a highest quality characteristic measurement, and reconfiguring the set of RLM-RS resources to correspond to the identified subset of candidate beams.

Embodiment 3: The method of embodiment 2, further comprising: continuing one or more timers and one or more counters associated with RLM synchronization based at least in part on reconfiguring the set of RLM-RS resources.

Embodiment 4: The method of embodiment 3, wherein the one or more timers associated with RLM synchronization comprise at least a T310 timer and the one or more counters associated with RLM synchronization comprise at least an N310 counter and N311 counter.

Embodiment 5: The method of embodiment 2, further comprising: receiving an indication for a number of candidate beams for the subset of the one or more candidate beams via RRC messaging.

Embodiment 6: The method of any of embodiments 1 to 5, further comprising: identifying a subset of one or more candidate beams with a highest quality characteristic measurement, transmitting an indication of the identified subset of candidate beams, and receiving an RLM-RS reconfiguration message based at least in part on the identified subset of candidate beams.

Embodiment 7: The method of embodiment 6, further comprising: resetting one or more timers and one or more counters associated with RLM synchronization based at least in part on receiving the RLM-RS reconfiguration message.

Embodiment 8: The method of embodiment 7, wherein the one or more timers associated with RLM synchronization comprise at least a T310 timer and the one or more counters associated with RLM synchronization comprise at least an N310 counter and N311 counter.

Embodiment 9: The method of any of embodiments 1 to 8, wherein the measuring comprises: performing periodic beam monitoring based at least in part on a beam monitoring configuration.

Embodiment 10: The method of any of embodiments 1 to 9, further comprising: identifying a beam monitoring event trigger based at least in part on the measuring, transmitting an indication of a subset of the one or more candidate beams with a highest quality characteristic measurement based at least in part on identifying the beam monitoring event trigger, and receiving an RLM-RS reconfiguration message based at least in part on the transmitted indication.

Embodiment 11: The method of embodiment 10, wherein the beam monitoring event trigger comprises a candidate beam of the one or more candidate beams having a quality characteristic that exceeds a threshold, a candidate beam of the one or more candidate beams having a quality characteristic that exceeds by an offset a quality characteristic of a resource of the set of RLM-RS resources, a candidate beam of the one or more candidate beams having a quality characteristic that exceeds by an offset a second threshold while a resource of the set of RLM-RS resources has a quality characteristic that falls below a third threshold.

Embodiment 12: The method of any of embodiments 1 to 11, wherein the set of RLM-RS resources are reconfigured via RRC messaging.

Embodiment 13: An apparatus comprising at least one means for performing a method of any of embodiments 1 to 12.

Embodiment 14: An apparatus for wireless communications comprising a processor; memory in electronic communication with the processor; and instructions stored in the memory and executable by the processor to cause the apparatus to perform a method of any of embodiments 1 to 12.

Embodiment 15: A non-transitory computer-readable medium storing code for wireless communications, the code comprising instructions executable by a processor to perform a method of any of embodiments 1 to 12.

Embodiment 16: A method of wireless communications, comprising: receiving, at a UE, a RLM-RS resource configuration for a set of RLM-RS resources, transmitting an indication of a candidate beam for beam failure recovery, and receiving an RLM-RS reconfiguration message based at least in part on the indicated candidate beam.

Embodiment 17: The method of embodiment 16, further comprising: resetting one or more timers and one or more counters associated with RLM synchronization based at least in part on receiving the RLM-RS reconfiguration message.

Embodiment 18: The method of embodiment 17, wherein the one or more timers associated with RLM synchronization comprise at least a T310 timer and the one or more counters associated with RLM synchronization comprise at least an N310 counter and N311 counter.

Embodiment 19: The method of any of embodiments 16 to 18, wherein the RLM-RS reconfiguration message is received via RRC messaging.

Embodiment 20: An apparatus comprising at least one means for performing a method of any of embodiments 16 to 19.

Embodiment 21: An apparatus for wireless communications comprising a processor; memory in electronic communication with the processor; and instructions stored in the memory and executable by the processor to cause the apparatus to perform a method of any of embodiments 16 to 19.

Embodiment 22: A non-transitory computer-readable medium storing code for wireless communications, the code comprising instructions executable by a processor to perform a method of any of embodiments 16 to 19.

Embodiment 23: A method of wireless communications, comprising: transmitting, to a UE, a RLM-RS resource configuration for a set of RLM-RS resources, receiving an indication of a subset of one or more candidate beams with a highest quality characteristic measurement, wherein the one or more candidate beams are different than the set of RLM-RS resources, and transmitting an RLM-RS reconfiguration message based at least in part on the indicated subset of candidate beam.

Embodiment 24: The method of embodiment 23, further comprising: further comprising: transmitting an indication for a number of candidate beams for the subset of the one or more candidate beams via RRC messaging.

Embodiment 25: The method of any of embodiments 23 or 24, wherein the RLM-RS reconfiguration message is transmitted via RRC messaging.

Embodiment 26: The method of any of embodiments 23 to 25, wherein the indication of the subset of one or more candidate beams is received periodically.

Embodiment 27: An apparatus comprising at least one means for performing a method of any of embodiments 23 to 26.

Embodiment 28: An apparatus for wireless communications comprising a processor; memory in electronic communication with the processor; and instructions stored in the memory and executable by the processor to cause the apparatus to perform a method of any of embodiments 23 to 26.

Embodiment 29: A non-transitory computer-readable medium storing code for wireless communications, the code comprising instructions executable by a processor to perform a method of any of embodiments 23 to 26.

Embodiment 30: A method of wireless communications, comprising: transmitting, to a UE, a RLM-RS resource configuration for a set of RLM-RS resources, receiving an indication of a candidate beam for beam failure recovery, and transmitting an RLM-RS reconfiguration message based at least in part on the indicated candidate beam.

Embodiment 31: The method of embodiment 30, wherein the RLM-RS reconfiguration message is transmitted via RRC messaging.

Embodiment 32: An apparatus comprising at least one means for performing a method of any of embodiments 30 or 31.

Embodiment 33: An apparatus for wireless communications comprising a processor; memory in electronic communication with the processor; and instructions stored in the memory and executable by the processor to cause the apparatus to perform a method of any of embodiments 30 or 31.

Embodiment 34: A non-transitory computer-readable medium storing code for wireless communications, the code comprising instructions executable by a processor to perform a method of any of embodiments 30 or 31.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   receiving, at a user equipment (UE), a radio link monitoring reference signal (RLM-RS) resource configuration for a set of RLM-RS resources associated with a network entity;
   measuring, by the UE, a quality characteristic of one or more candidate spatial beams associated with the network entity, wherein the one or more candidate spatial beams are different than the set of RLM-RS resources;
   identifying, by the UE, a subset of the one or more candidate spatial beams with a highest quality characteristic measurement;
   reconfiguring, at the UE, the set of RLM-RS resources to a different set of RLM-RS resources associated with the network entity, the different set of RLM-RS resources corresponding to the identified subset of the one or more candidate spatial beams associated with the network entity based at least in part on the measuring and the identifying; and
   continuing one or more timers and one or more counters for RLM synchronization based at least in part on reconfiguring the set of RLM-RS resources.

2. The method of claim 1, wherein the one or more timers for RLM synchronization comprise at least a T310 timer and the one or more counters for RLM synchronization comprise at least an N310 counter and N311 counter.

3. The method of claim 1, further comprising:
   receiving an indication for a number of candidate spatial beams for the subset of the one or more candidate spatial beams via radio resource control (RRC) messaging.

4. The method of claim 1, further comprising:
   transmitting an indication of the identified subset of candidate spatial beams; and
   receiving an RLM-RS reconfiguration message based at least in part on the identified subset of candidate spatial beams, wherein reconfiguring the set of RLM-RS resources to the different set of RLM-RS resources is based at least in part on receiving the RLM-RS reconfiguration message.

5. The method of claim 4, further comprising:
resetting the one or more timers and the one or more counters associated with RLM synchronization based at least in part on receiving the RLM-RS reconfiguration message.

6. The method of claim 5, wherein the one or more timers associated with RLM synchronization comprise at least a T310 timer and the one or more counters associated with RLM synchronization comprise at least an N310 counter and N311 counter.

7. The method of claim 1, wherein the measuring comprises:
performing periodic spatial beam monitoring based at least in part on a spatial beam monitoring configuration.

8. The method of claim 1, further comprising:
identifying a spatial beam monitoring event trigger based at least in part on the measuring;
transmitting an indication of the subset of the one or more candidate spatial beams with the highest quality characteristic measurement based at least in part on identifying the spatial beam monitoring event trigger; and
receiving an RLM-RS reconfiguration message based at least in part on the transmitted indication.

9. The method of claim 8, wherein the spatial beam monitoring event trigger comprises a candidate spatial beam of the one or more candidate spatial beams having a quality characteristic that exceeds a threshold, a candidate spatial beam of the one or more candidate spatial beams having a quality characteristic that exceeds by an offset a quality characteristic of a resource of the set of RLM-RS resources, a candidate spatial beam of the one or more candidate spatial beams having a quality characteristic that exceeds by an offset a second threshold while a resource of the set of RLM-RS resources has a quality characteristic that falls below a third threshold.

10. The method of claim 1, wherein the set of RLM-RS resources are reconfigured via radio resource control (RRC) messaging.

11. A method for wireless communications, comprising:
receiving, at a user equipment (UE), a radio link monitoring reference signal (RLM-RS) resource configuration for a set of RLM-RS resources associated with a network entity;
identifying, by the UE, a candidate spatial beam of at least one or more candidate spatial beams associated with the network entity for spatial beam failure recovery;
transmitting, by the UE, an indication of the candidate spatial beam associated with the network entity for spatial beam failure recovery;
receiving, by the UE, an RLM-RS reconfiguration message indicating to reconfigure the set of RLM-RS resources to a different set of RLM-RS resources associated with the network entity, the different set of RLM-RS resources corresponding to the indicated candidate spatial beam associated with the network entity based at least in part on the indicated candidate spatial beam; and
resetting one or more timers and one or more counters for RLM synchronization based at least in part on receiving the RLM-RS reconfiguration message.

12. The method of claim 11, wherein the one or more timers for RLM synchronization comprise at least a T310 timer and the one or more counters for RLM synchronization comprise at least an N310 counter and N311 counter.

13. The method of claim 11, wherein the RLM-RS reconfiguration message is received via radio resource control (RRC) messaging.

14. A method for wireless communications, comprising:
transmitting, to a user equipment (UE), a radio link monitoring reference signal (RLM-RS) resource configuration for a set of RLM-RS resources associated with a network entity;
receiving, from the UE, an indication of a subset of one or more candidate spatial beams associated with the network entity with a highest quality characteristic measurement, wherein the one or more candidate spatial beams are different than the set of RLM-RS resources; and
transmitting, to the UE, an RLM-RS reconfiguration message indicating to reconfigure the set of RLM-RS resources to a different set of RLM-RS resources associated with the network entity based at least in part on the indicated subset of candidate spatial beams associated with the network entity, wherein an RLM synchronization with the UE is based at least in part on transmitting the RLM-RS reconfiguration message.

15. The method of claim 14, further comprising:
transmitting an indication for a number of candidate spatial beams for the subset of the one or more candidate spatial beams via radio resource control (RRC) messaging.

16. The method of claim 14, wherein the RLM-RS reconfiguration message is transmitted via radio resource control (RRC) messaging.

17. The method of claim 14, wherein the indication of the subset of one or more candidate spatial beams is received periodically.

* * * * *